(12) United States Patent
Kim et al.

(10) Patent No.: US 10,416,778 B2
(45) Date of Patent: Sep. 17, 2019

(54) MOBILE TERMINAL AND CONTROL METHOD THEREFOR

(71) Applicant: LG ELECTRONICS INC., Seoul (KR)

(72) Inventors: Taehyeong Kim, Seoul (KR); Kamin Lee, Seoul (KR); Sungjin Kim, Seoul (KR); Sangki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 15/536,976

(22) PCT Filed: Jan. 20, 2015

(86) PCT No.: PCT/KR2015/000606
§ 371 (c)(1),
(2) Date: Jun. 16, 2017

(87) PCT Pub. No.: WO2016/114437
PCT Pub. Date: Jul. 21, 2016

(65) Prior Publication Data
US 2017/0351335 A1    Dec. 7, 2017

(30) Foreign Application Priority Data

Jan. 12, 2015 (KR) .................. 10-2015-0004377

(51) Int. Cl.
*G06F 3/16* (2006.01)
*G06F 3/01* (2006.01)
(Continued)

(52) U.S. Cl.
CPC ............... *G06F 3/017* (2013.01); *G06F 3/01* (2013.01); *G06K 9/00355* (2013.01);
(Continued)

(58) Field of Classification Search
CPC .......... G06F 3/017; G06F 3/165; G06F 3/013; G09G 5/10
(Continued)

(56) References Cited

U.S. PATENT DOCUMENTS

2007/0222617 A1    9/2007  Chai et al.
2012/0194419 A1*   8/2012  Osterhout .......... G02B 27/0093
                                                            345/156
(Continued)

FOREIGN PATENT DOCUMENTS

KR    10-2013-0036934 A    4/2013
KR    10-2013-0124138 A    11/2013
(Continued)

*Primary Examiner* — Calvin C Ma
(74) *Attorney, Agent, or Firm* — Birch, Stewart, Kolasch & Birch, LLP

(57) ABSTRACT

The present invention relates to a mobile terminal capable of providing path information, and a control method therefor. The mobile terminal according to one embodiment of the present invention comprises: a camera; and a control unit for activating, if an event occurs, the camera, detecting whether the mobile terminal is in a vehicle-mounted state and whether the vehicle is traveling by using images received through the camera and, if it is determined, according to the detection result, that the vehicle is traveling in a state in which the mobile terminal is mounted on the vehicle, activating a gesture function of controlling the event by recognizing a gesture of a user.

20 Claims, 22 Drawing Sheets

(51) Int. Cl.
| | |
|---|---|
| H04W 4/48 | (2018.01) |
| H04W 4/04 | (2009.01) |
| H04W 88/02 | (2009.01) |
| G06K 9/00 | (2006.01) |
| H04M 1/725 | (2006.01) |
| H04N 5/232 | (2006.01) |
| H04M 19/04 | (2006.01) |
| H04W 4/024 | (2018.01) |
| G09G 5/10 | (2006.01) |

(52) U.S. Cl.
CPC ....... *H04M 1/72563* (2013.01); *H04M 19/04* (2013.01); *H04N 5/23219* (2013.01); *H04N 5/23245* (2013.01); *H04W 4/04* (2013.01); *H04W 4/48* (2018.02); *H04W 88/02* (2013.01); *G06F 3/165* (2013.01); *G09G 5/10* (2013.01); *G09G 2354/00* (2013.01); *G09G 2360/144* (2013.01); *G09G 2380/10* (2013.01); *H04W 4/024* (2018.02); *Y02D 70/00* (2018.01)

(58) Field of Classification Search
USPC .................................................. 345/102, 165
See application file for complete search history.

(56) References Cited

U.S. PATENT DOCUMENTS

| | | | |
|---|---|---|---|
| 2013/0155237 A1* | 6/2013 | Paek | ..................... G06F 1/1632 |
| | | | 348/148 |
| 2014/0354538 A1* | 12/2014 | Lee | ......................... G06F 3/013 |
| | | | 345/156 |
| 2015/0070337 A1* | 3/2015 | Bell | ..................... G09G 3/2003 |
| | | | 345/207 |

FOREIGN PATENT DOCUMENTS

| | | |
|---|---|---|
| KR | 10-2014-0055033 A | 5/2014 |
| KR | 10-1412616 B1 | 6/2014 |
| WO | WO 2013/101058 A1 | 7/2013 |

\* cited by examiner

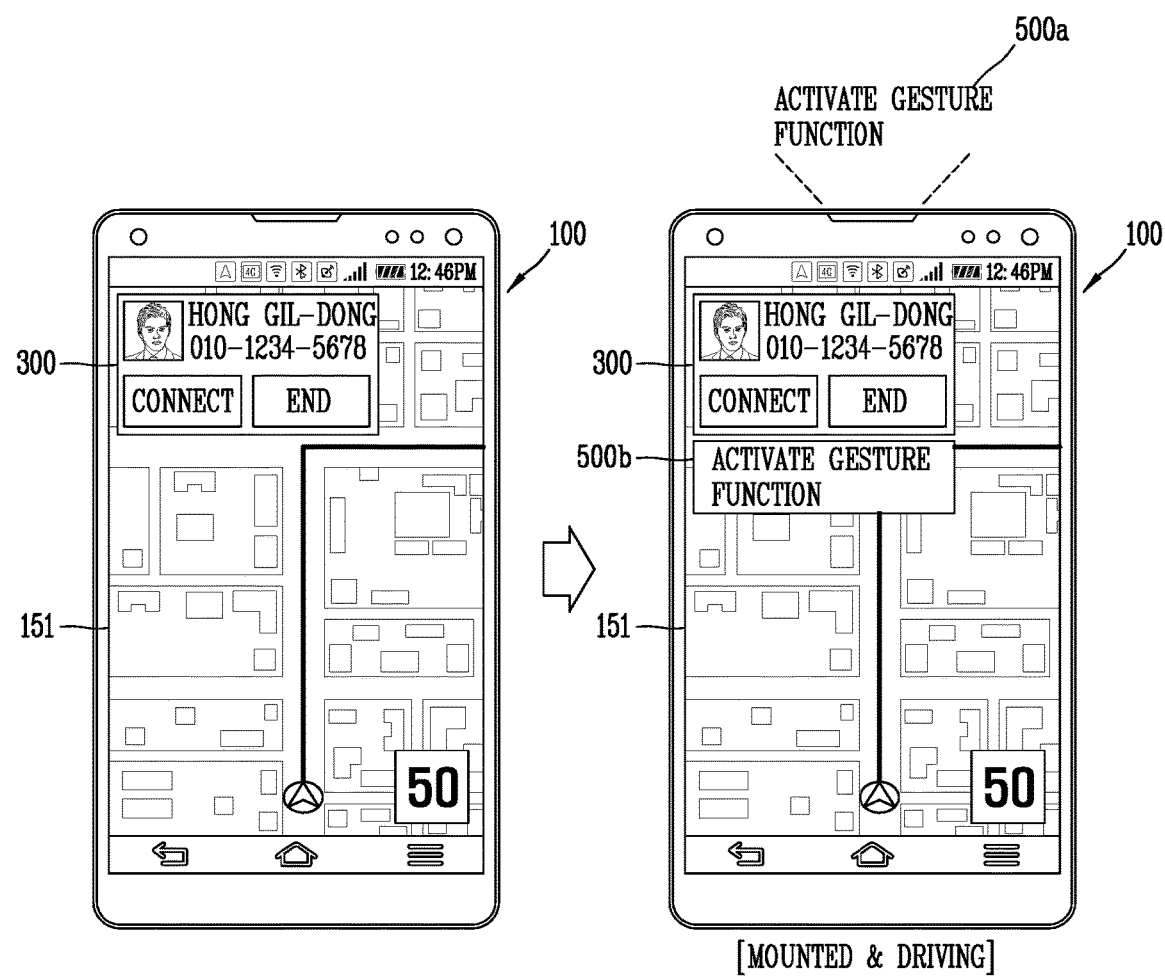

MOBILE TERMINAL AND CONTROL METHOD THEREFOR

CROSS REFERENCE TO RELATED APPLICATIONS

This application is the National Phase of PCT International Application No. PCT/KR2015/000606, filed on Jan. 20, 2015, which claims priority under 35 U.S.C. 119(a) to Patent Application No. 10-2015-0004377, filed in Republic of Korea on Jan. 12, 2015, all of which are hereby expressly incorporated by reference into the present application.

BACKGROUND OF THE INVENTION

1. Field of the Invention

The present disclosure relates to a mobile terminal capable of providing route information and a control method thereof.

2. Description of the Related Art

Terminals may be divided into mobile/portable terminals and stationary terminals according to their mobility. Also, the mobile terminals may be classified into handheld terminals and vehicle mount terminals according to whether or not a user can directly carry.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

In recent years, cases in which a navigation function for providing map information and route information is mounted on a mobile terminal to use the navigation function mounted on the terminal while driving the vehicle have increased.

On the other hand, when an event (for example, a phone call or text message) occurs while using the navigation function mounted on the terminal, a user who is driving a vehicle may observe the terminal other than keeping eyes forward in response to the event, and take an action other than driving the vehicle, thereby causing a problem that the accident rate of the vehicle increases.

SUMMARY OF THE INVENTION

An object of the present invention is to provide a mobile terminal capable of sensing that a user of a mobile terminal is driving and a control method thereof.

Another object of the present invention is to provide a mobile terminal capable of recognizing a gesture of a user to perform a specific function when the user of the mobile terminal is driving, and a control method thereof.

A mobile terminal according to an embodiment of the present disclosure may include a camera, and a controller configured to activate the camera when an event occurs, and sense whether or not the mobile terminal is mounted on a vehicle and whether or not the vehicle is driving using an image received through the camera, and recognize a gesture of a user to activate a gesture function for controlling the event when it is determined that the vehicle is driving in a state that the mobile terminal is mounted on the vehicle according to the sensed result.

According to an embodiment, the camera may include a front camera disposed on a front surface of a body of the mobile terminal and a rear camera disposed on a rear surface of the body, wherein the controller senses whether or not the mobile terminal is mounted on the vehicle and whether or not the vehicle is driving using an image received through the front camera and an image received through the rear camera when the event occurs.

According to an embodiment, the controller may determine that the vehicle is driving in a state that the mobile terminal is mounted on the vehicle based on a change of an image in a region having a size smaller than a reference size on the image received through the front camera, and a change of an image in a region having a size larger than the reference size on the image received through the rear camera.

According to an embodiment, the mobile terminal may further include a sensing unit configured to sense the movement of the mobile terminal, wherein the controller activates either one of the front and the rear camera when a change pattern of an acceleration value sensed according to the movement of the mobile terminal corresponds to a preset pattern, and activates the gesture function based on a change of at least part of an image received through the either one camera.

According to an embodiment, the either one camera may be a rear camera, and the gesture function may be activated based on a change of an image in a region having a size larger than a reference size on the image received through the rear camera.

According to an embodiment, when the gesture function is activated, the controller may output notification information indicating that the gesture function has been activated.

According to an embodiment, the mobile terminal may further include a display unit, and a sensing unit configured to sense ambient environment information surrounding the mobile terminal, wherein the controller increases an output brightness of the display unit when it is determined that the surrounding of the mobile terminal is darker than a reference brightness through the sensing unit during the activation of the gesture function.

According to an embodiment, the mobile terminal may further include an audio output unit, wherein the controller outputs an alarm sound indicating that the event has occurred through the audio output unit, and changes a volume of the alarm sound to guide the recognition of a hand of a user when the hand is recognized after the activation of the gesture function.

According to an embodiment, the controller may control the event based on the recognition of a preset gesture.

According to an embodiment, the controller may perform a first function associated with the event when a first gesture is recognized among the preset gestures, and perform a second function different from the first function associated with the event when a second gesture different from the first gesture is recognized among the preset gestures.

According to an embodiment, when the gesture function is activated, the controller may recognize a hand of a user from an image received through the camera, and determine whether or not a gesture of the hand corresponds to the preset gesture.

According to an embodiment, when the event is an incoming call, a first function associated with the event may be a function of connecting the incoming call, and a second function associated with the event may be a function of terminating the incoming call.

According to an embodiment, the controller may terminate the connected call when the first gesture is sensed again when the call is connected.

According to an embodiment, the controller may switch the gesture function to an inactive state based on whether the mobile terminal satisfies a preset condition in a state that the gesture function is activated.

According to an embodiment, the controller may switch the activated gesture function to an inactive state based on whether a vehicle mounted with the mobile terminal is stopped.

According to an embodiment, the activated gesture function may be switched to an inactive state after a preset period of time has passed even when the vehicle mounted with the mobile terminal is stopped, and maintain an active state when the vehicle is changed again to a driving state before the preset period of time has passed in a state that the vehicle is stopped.

A method of controlling a mobile terminal according to an embodiment of the present disclosure may include activating a camera when an event occurs, and sensing whether or not the mobile terminal is mounted on a vehicle and whether or not the vehicle is driving using an image received through the camera, and recognizing a gesture of a user to activate a gesture function for controlling the event when it is determined that the vehicle is driving in a state that the mobile terminal is mounted on the vehicle according to the sensed result.

According to an embodiment, the camera may include a front camera disposed on a front surface of a body of the mobile terminal and a rear camera disposed on a rear surface of the body, wherein said sensing step senses whether or not the mobile terminal is mounted on the vehicle and whether or not the vehicle is driving using an image received through the front camera and an image received through the rear camera when the event occurs.

According to an embodiment, the method may further include controlling the event based on the recognition of a preset gesture.

According to an embodiment, said controlling step may perform a first function associated with the event when a first gesture is recognized among the preset gestures, and perform a second function different from the first function associated with the event when a second gesture different from the first gesture is recognized among the preset gestures.

The present disclosure may sense whether or not a vehicle is driving in a state that the mobile terminal is mounted on the vehicle when an event occurs, and activate a gesture function based on whether the vehicle is driving in a state that the mobile terminal is mounted on the vehicle. Therefore, the present disclosure may activate a gesture function only when a user is driving at the time of the occurrence of the event, thereby reducing the battery consumption.

The present disclosure may recognize a gesture of a user to control an event when the user of the mobile terminal is driving at the time of the occurrence of the event. Through this, the user may control the event without losing sight while driving, thereby significantly reducing the accident rate.

Further scope of applicability of the present disclosure will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A and 5B are conceptual views for explaining notification information for notifying that a gesture function according to an embodiment of the present disclosure has been activated;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
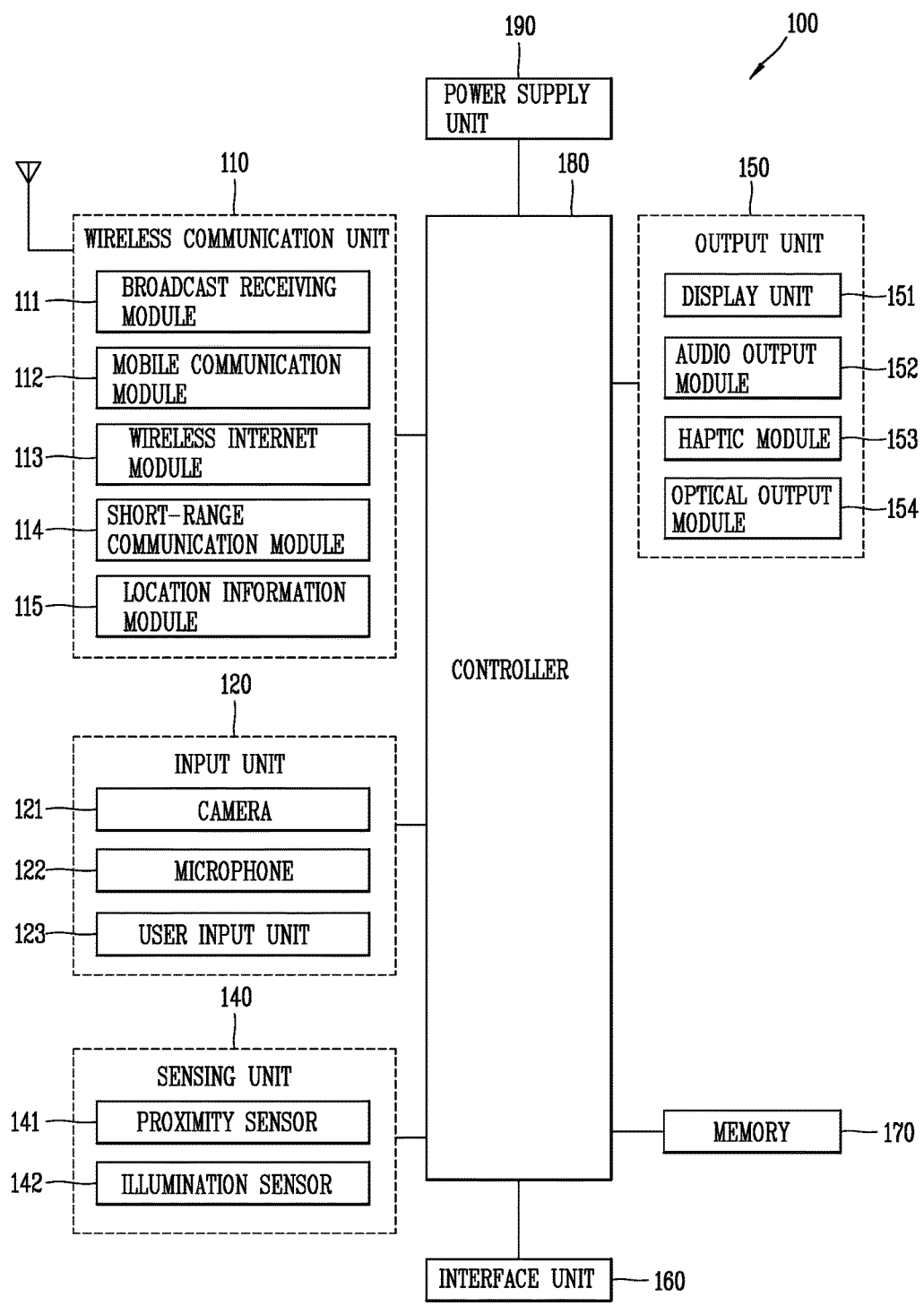
FIG. 1A is a block diagram illustrating a mobile terminal associated with the present disclosure.
Figure 1B:
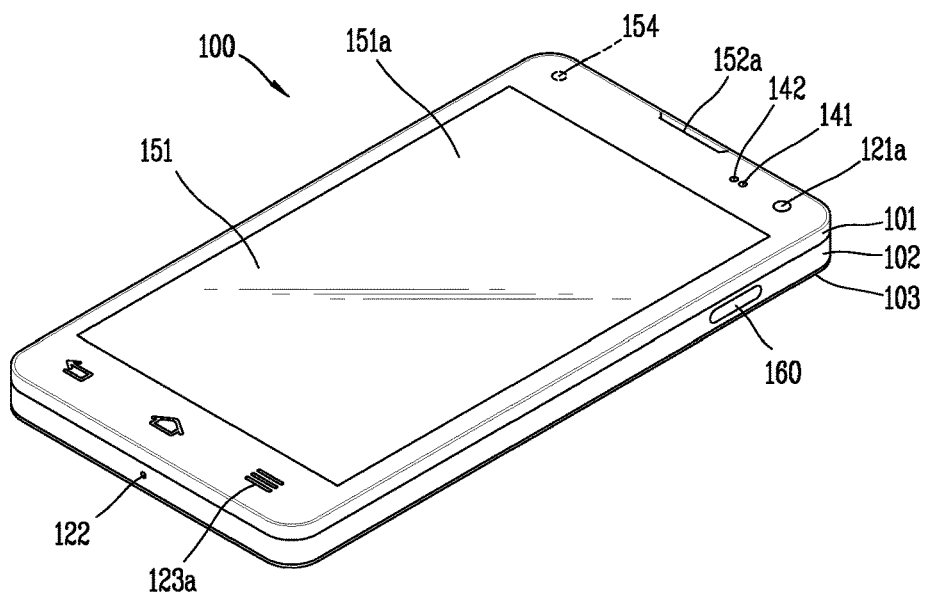
FIGS. 1B and 1C are conceptual views in which an example of a mobile terminal associated with the present disclosure is seen from different directions.
Figure 1C:
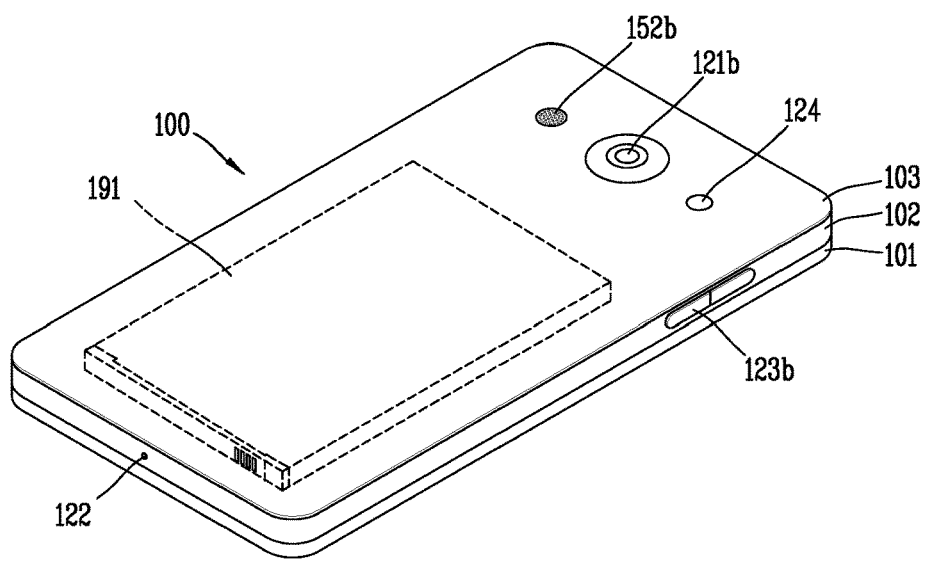

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory unit 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The present disclosure may be associated with a specific type of mobile terminal, but the description of the specific type of the mobile terminal may be typically applicable to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

A location information module 115 of the mobile terminal is configured to acquire a position of the mobile terminal. Such location information module 115 may include a Global Position System (GPS) module and a Wireless Fidelity (Wi-Fi) module. As needed, the location information module 115 may perform any function of the other modules of the wireless communication unit 110 to obtain data on the location of the mobile terminal in a substitutive or additional manner.

The GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. It is difficult to precisely measure a position of the mobile terminal using the GPS module, in a blind spot of satellite signals such as an indoor space. In order to compensate for the positioning technique using such GPS module, a Wi-Fi Positioning System (WPS) may be utilized.

The Wi-Fi positioning system (WPS) refers to a location determination technology based on a wireless local area network (WLAN) using Wi-Fi as a technology for tracking the location of the mobile terminal 100 using a Wi-Fi module provided in the mobile terminal 100 and a wireless access point for transmitting and receiving to and from the Wi-Fi module.

The Wi-Fi positioning system may include a Wi-Fi location determination server, a mobile terminal 100, a wireless access point (AP) connected to the mobile terminal, and a database stored with any wireless AP information.

The mobile terminal 100 connected to the wireless AP may transmit a location information request message to the Wi-Fi location determination server.

The Wi-Fi location determination server extracts the information of the wireless AP connected to the mobile terminal 100, based on the location information request message of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, SSID, RSSI, channel information, privacy, network type, signal strength and noise strength.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, etc.

The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low.

The fingerprint method is used to collect signal strength information by selecting a reference position from a service area, and to track a position of a mobile terminal using the signal strength information transmitted from the mobile terminal based on the collected information. In order to use the fingerprint method, characteristics of radio signals should be pre-stored in the form of database.

The trigonometry method is used to calculate a position of a mobile terminal, based on a distance between coordinates of at least three wireless APs and the mobile terminal. In order to measure the distance between the mobile terminal and the wireless AP, signal strength may be converted into distance information, or Time of Arrival (ToA) taken for wireless signals to be transmitted may be used.

The landmark method is used to measure a position of a mobile terminal using a known landmark transmitter.

Besides the above methods, various algorithms may be used to extract (analyze) location information of a mobile terminal.

Such extracted location information of the mobile terminal 100 is transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment where the mobile terminal 100 is positioned.

Hereinafter, preferred embodiments related to a control method which can be implemented in the mobile terminal will be described in more detail with reference to the accompanying drawings. It is obvious to those skilled in the art that the present features can be embodied in several forms without departing from the characteristics thereof.

Furthermore, in case where at least two images are illustrated in a two by two matrix in one drawing (FIG. N) when described below with reference to the accompanying drawings, an image illustrated in an upper left end thereof, an image illustrated in an upper right end thereof, an image illustrated in a lower right end thereof, and an image illustrated in a lower left end thereof are referred to as a "first drawing", a "second drawing", a "third drawing", and a "fourth drawing", respectively.

On the other hand, in case where at least two images are illustrated in a column from an upper end thereof to a lower end thereof in one drawing (FIG. N), they are sequentially referred to as a "first drawing", a "second drawing", . . . from the image at the uppermost end thereof.

In addition, in case where at least two images are illustrated in a row from a left end thereof to a right end thereof in one drawing (FIG. N), they are sequentially referred to as a "first drawing", a "second drawing", . . . from the image at the leftmost end thereof.

A mobile terminal according to an embodiment of the present disclosure capable of including at least one of the foregoing components, may execute a navigation function (or a navigation application). The navigation function may be carried out based on whether an icon (or an icon of the application) associated with the execution of the navigation function is selected (or touched). When the navigation function is carried out through the icon, the display unit 151 may be in an on state.

Map information may be displayed on the display unit 151 based on the execution of the navigation function. Furthermore, the controller 180 may display route information set based on a user request on the map information. Specifically, the navigation function may denote a function of outputting map information and outputting route information from a current location of the mobile terminal to a destination on the basis of destination information input by a user.

Here, the map information may be stored in the memory 170. In this case, the controller 180 may display the map information stored in the memory on the display unit 151 when the navigation function is carried out.

Furthermore, the map information may be received from an external server (or external device). Specifically, when the navigation function is carried out, the controller 180 may receive map information from an external server and display the received map information on the display unit 151.

Meanwhile, according to the present disclosure, various information may be displayed on map information using the map information displayed on the display unit 151. The various information includes all types of information associated with map information. For example, the various information may include location information, route information, traffic information, geographical information, and actual information and the like of the mobile terminal.

For example, an icon capable of activating the location information module 115 (for example, GPS module) may be displayed on map information displayed on the display unit 151. When the icon is selected, the controller 180 may acquire the location information of the mobile terminal 100. Then, the controller 180 may display an icon (location information of the mobile terminal) for guiding the location of the mobile terminal 100 on the map information based on the acquired location information of the mobile terminal 100.

For another example, when destination information is input based on a user request, the controller 180 may display route information between a place at which the mobile terminal is currently located and input destination on the map information 300. In addition, when departure and destination information are input based on a user request, the controller 180 may display route information 210 between the departure and destination information on map information 200.

Through the foregoing configuration, the present disclosure may provide the location information of the mobile terminal using map information, and perform a navigation function using the location information and route information displayed on the map information. Furthermore, a user may receive route information using a navigation function mounted on the mobile terminal while driving a vehicle.

Meanwhile, various events may occur on the mobile terminal of the present disclosure. The event may include all types of functions that are executable on the mobile terminal, and for an example, may include an incoming call (call signal), an incoming message, incoming notification information (for example, push message) associated with an application, an alarm, and the like.

Here, when an event occurs on the mobile terminal while a user is driving a vehicle using a navigation function mounted on the mobile terminal, the user's gaze and operation may be dispersed in the process of responding (checking) the event.

Hereinafter, a method capable of sensing whether or not a user of the mobile terminal is driving a vehicle when an event occurs on the mobile terminal according to an embodiment of the present disclosure, and controlling the event while minimizing an effect of the user's gaze and operation on his or her driving when it is determined that the vehicle is driving will be described in more detail with reference to the accompanying drawings.

Figure 2:
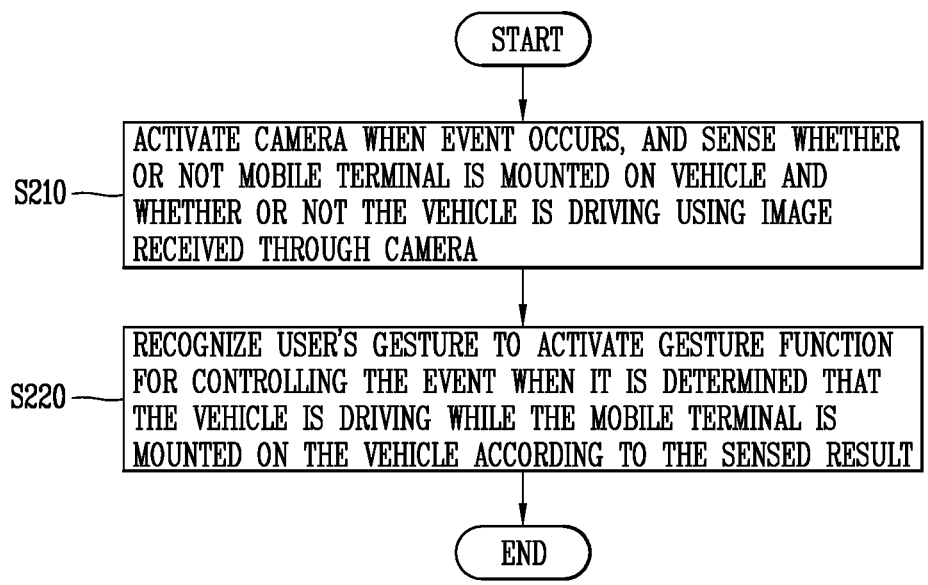
FIG. 2 is a flow chart representatively illustrating a control method of the present disclosure.
Figure 3A:
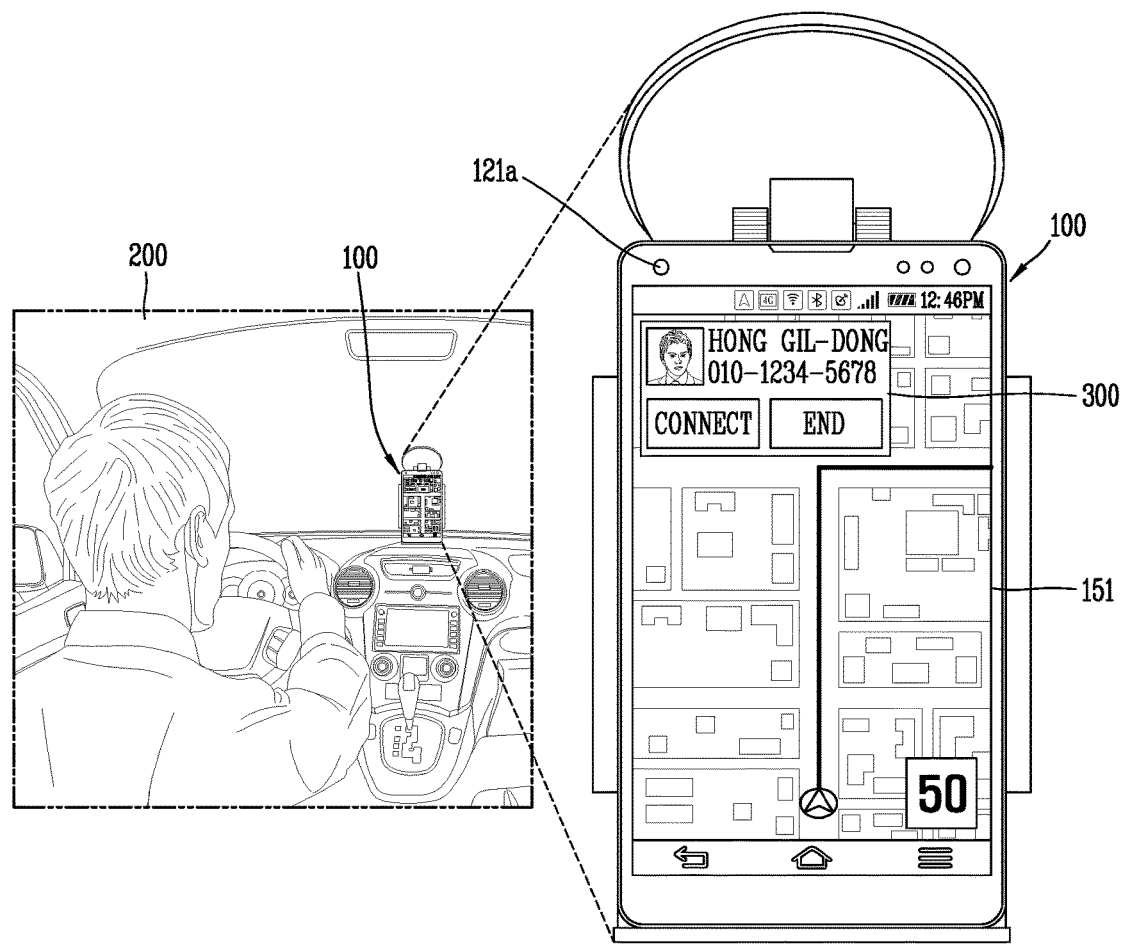
FIGS. 3A through 3C are conceptual views for explaining a control method illustrated in FIG. 2.
Figure 3B:
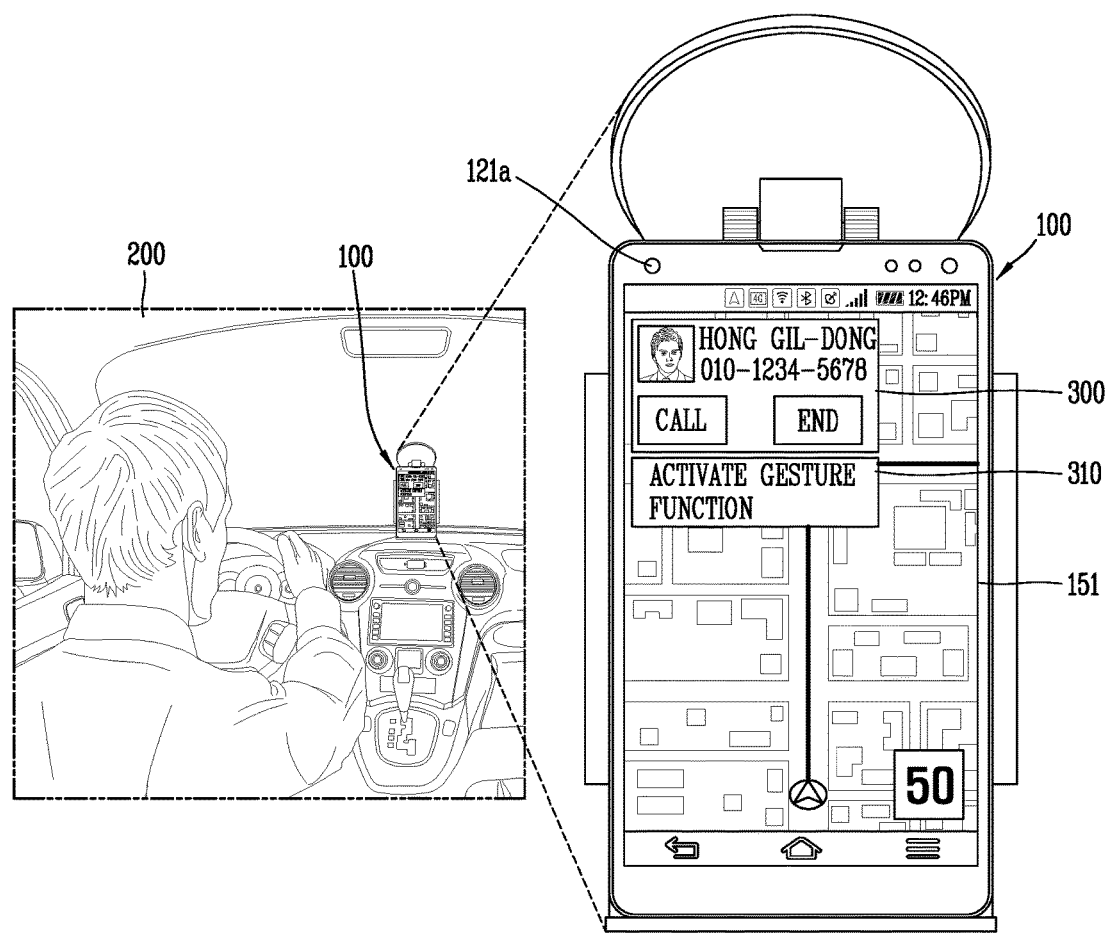
Figure 3C:
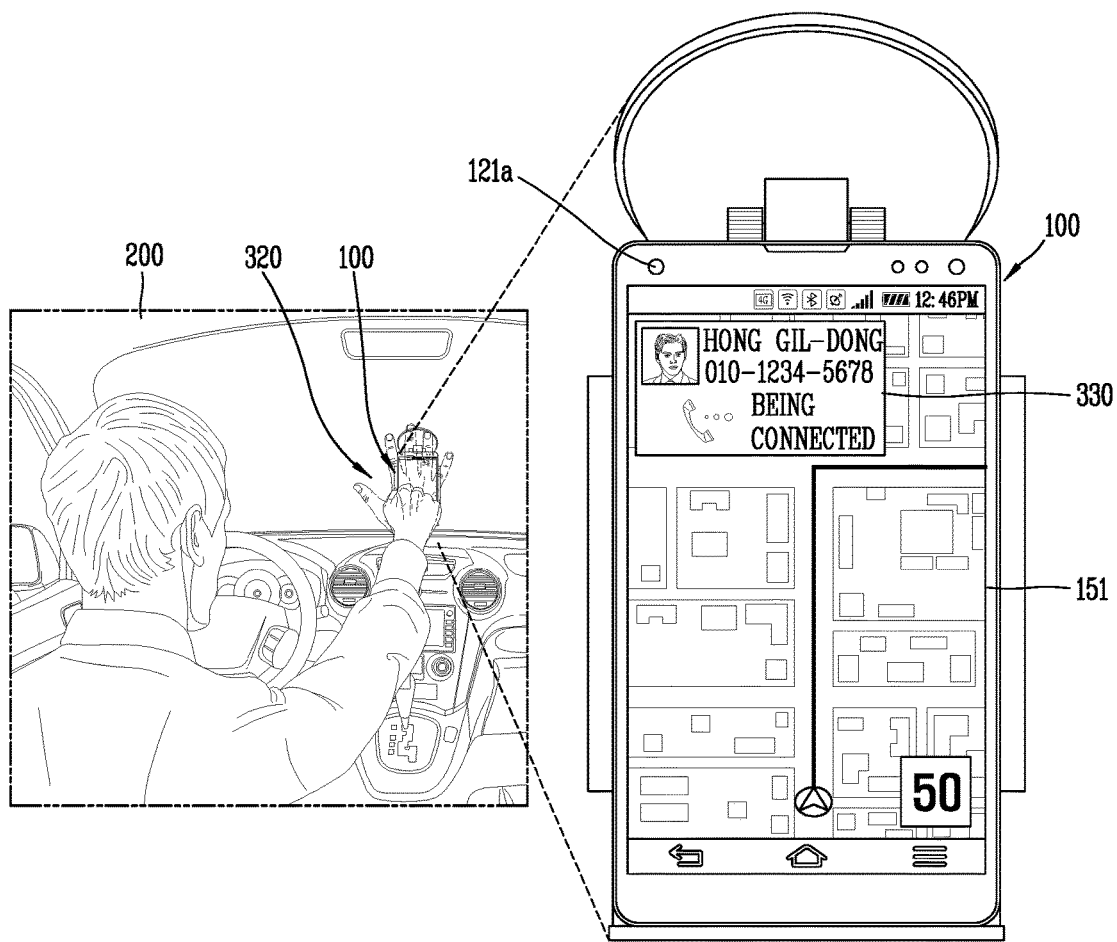

FIG. 2 is a flow chart representatively illustrating a control method of the present disclosure, and FIGS. 3A through 3C are conceptual views for explaining a control method illustrated in FIG. 2.

First of all, an event 300 may occur on the mobile terminal of the present disclosure. For example, when the event 300 occurs (for example, a call is received (a call signal is received) from another terminal (or an external server) via the wireless communication unit, a message is received, or notification information (for example, a push message) associated with an application is received), screen information associated with the event 300 may be displayed on the display unit 151.

On the other hand, when the event 300 occurs, the controller 180 may determine whether or not a user is driving. Specifically, the controller 180 may determine that the user is driving when a vehicle 200 is in a state that the mobile terminal 100 is mounted on the vehicle 200.

For example, when it is determined that the vehicle 200 is driving in a state that the mobile terminal 100 is not mounted on the vehicle 200, the controller 180 may determine that the user of the mobile terminal 100 is merely in the vehicle 200 but not driving the vehicle 200.

For an example, a case where the vehicle 200 is driving in a state that the mobile terminal 100 is not mounted on the vehicle 200 may include a case where the user is seated in a seat other than the driver's seat, a case where the user merely boards a bus or train, and the like.

In this case, the controller 180 may restrict the execution of a specific function (for example, a gesture function, a voice recognition function, etc.) based on the occurrence of the event 300, and control the event 300 using an existing control method.

Again, the controller 180 may sense whether or not the mobile terminal 100 is mounted on the vehicle 200 and whether or not the vehicle 200 is driving to determine whether or not the user of the mobile terminal 100 is driving.

In other words, according to the present disclosure, when the event 300 occurs, the process of activating the camera 121, and sensing whether or not the mobile terminal 100 is mounted on the vehicle 200 and whether or not the vehicle 200 is driving using an image 400 received through the camera 121 is carried out (S210).

Specifically, when the event 300 occurs, the controller 180 may display screen information associated with the event 300 on the display unit 151. Furthermore, the controller 180 may activate the camera 121 based on the occurrence of the event 300, and receive the image 400 through the camera 121. The controller 180 determines whether or not the mobile terminal 100 is mounted on the vehicle 200 and whether or not the vehicle 200 is driving, namely, whether or not the user is driving, using the image 400 received through the camera 121.

In addition, the controller 180 may sense whether or not the user is driving in various ways. For example, the controller 180 may sense whether or not the user is driving based on an acceleration sensor, a GPS module, an application being carried out on the mobile terminal, or the like.

A specific method of sensing whether or not the user is driving will be described later with reference to FIGS. 4A through 4C.

On the other hand, according to the present disclosure, when it is determined that the vehicle 200 is driving in a state that the mobile terminal 100 is mounted on the vehicle 200 according to the sensed result, the process of recognizing the user's gesture to activate a gesture function for controlling the event (S220) is carried out.

Specifically, when it is determined that the vehicle 200 is driving in a state that the mobile terminal 100 is mounted on the vehicle 200, the controller 200 determines that the vehicle 200 is driving. The controller 180 may activate various functions based on whether the user is driving, and for an example, the controller 180 may activate a gesture function 310.

The gesture function may denote a function of executing a specific function based on a user's gesture (or an action, a behavior, a movement, etc.) and may be referred to as a gesture recognition function, an operation function, an operation recognition function, a motion recognition function, or the like.

Specifically, when a gesture function is activated, the controller 180 may recognize a gesture 320 of the user and control the event 300. Here, the controller 180 may perform a function associated with the preset gesture based on the recognized gesture corresponding to a preset gesture.

For example, when a first gesture is recognized among the preset gestures, the controller 180 may perform a first function associated with an event associated with the first gesture. In addition, when a second gesture different from the first gesture is recognized among the preset gestures, the controller 180 may perform a second function associated with an event associated with the second gesture.

The controller 180 may recognize a gesture of a user using an image received through the camera 121. Specifically, the controller 180 may activate the camera 121 when a gesture function is activated (executed). Then, the controller 180 may recognize the user's gesture using an image received through the camera 121, and determine whether or not the recognized gesture corresponds to a preset gesture.

For example, the controller 180 may analyze the image received through the camera 121 to determine whether or not a graphic object corresponding to a preset object 610 (for example, a user's hand) exists among graphic objects included in the image. The controller 180 may recognize the preset object 610 based on whether the graphic object corresponding to the preset object 610 is included in the image.

Then, when the recognized object 610 takes a gesture (an action, a behavior, a movement, etc.), the controller 180 may recognize the gesture based on a change of the graphic object corresponding to the object 610 in the image. Then, the controller 180 may perform a function associated with the preset gesture based on the recognized gesture corresponding to the preset gesture.

For example, when receiving a call (receiving a call signal), the controller 180 may connect the call based on whether the recognized object (for example, a user's hand)

recognizes a preset gesture (for example, a gesture of grabbing his or her hand from an open hand state (a fist-grabbing gesture)).

The foregoing description will be more clearly understood with reference to FIGS. 3A through 3C.

As illustrated in FIG. 3A, when the event 300 occurs, the controller 180 may display screen information associated with the event 300 on the display unit 151. Here, the event 300 may be an incoming call, for an example.

Then, when the event 300 occurs, the controller 180 may sense whether or not the mobile terminal 100 is mounted on (or fixed to) the vehicle 200 and whether or not the vehicle 200 is driving. For an example, the controller 180 may activates the camera 121 based on the occurrence of the event 300, and sense whether or not the mobile terminal 100 is mounted on the vehicle 200 and whether or not the vehicle 200 is driving using an image received through the camera 121.

When it is determined that the vehicle 200 is driving while the mobile terminal 100 is mounted on the vehicle 200, namely, when it is determined that the user is driving, as illustrated in FIG. 3B, the controller 180 may activate the gesture function 310. The gesture function 310 may be a function of recognizing a gesture of the user to control the event 300.

Then, as illustrated in FIG. 3C, the controller 180 may recognize the user's gesture 320 and control (330) the event 300 based on the recognized gesture 320 corresponding to the preset gesture. For example, the controller 180 may connect (330) an incoming call based on the sensing of a gesture of grabbing the user's hand from an open hand state. When the event is controlled (the call is connected), the display unit 151 may display screen information indicating that the event is controlled (the call is connected) (330) as illustrate in FIG. 3C.

Through the foregoing configuration, when the event occurs, the present disclosure may sense whether or not the user is driving, and activate a specific function (for example, a gesture function) capable of the event only when the user is driving. Therefore, the present disclosure may reduce battery consumption caused by always executing a mode (function) for determining that the user is driving even when an event does not occur.

In addition, the present disclosure may provide an optimized UI (User Interface)/UX (User Experience) capable of controlling the occurred event while minimizing the user's gaze and operation for an event that has occurred while the user is driving.

Hereinafter, a gesture function will be described as an example for the sake of convenience of explanation. However, the present disclosure is not limited thereto, and may be analogically applied in the same or similar manner as long as it is a function capable of minimally affecting the gaze and operation of the user who is driving.

Hereinafter, a method for sensing whether or not a user of the mobile terminal 100 is driving according to the present disclosure will be described in detail with reference to the accompanying drawings.

Figure 4A:
FIGS. 4A, 4B, and 4C are conceptual views illustrating a method of detecting whether or not the vehicle is driving while the mobile terminal is mounted on the vehicle according to an embodiment of the present disclosure.
Figure 4A:
Figure 4A:
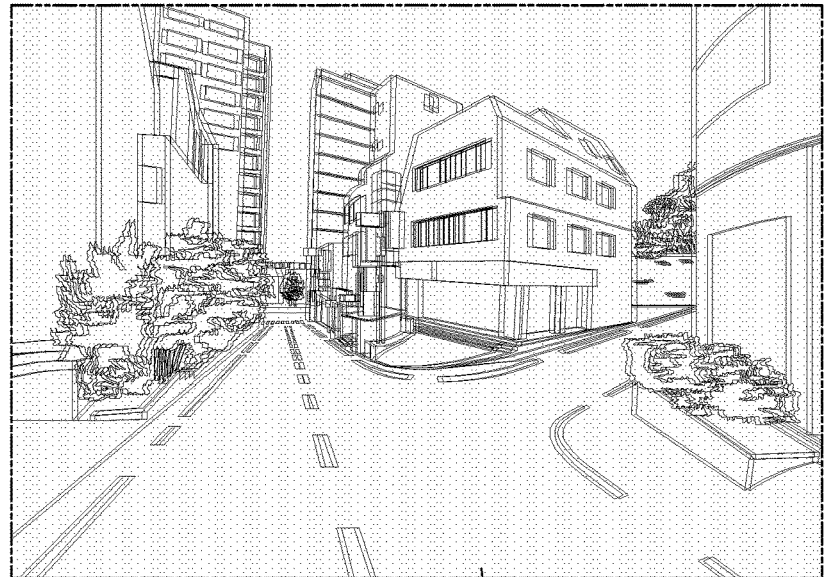
Figure 4B:
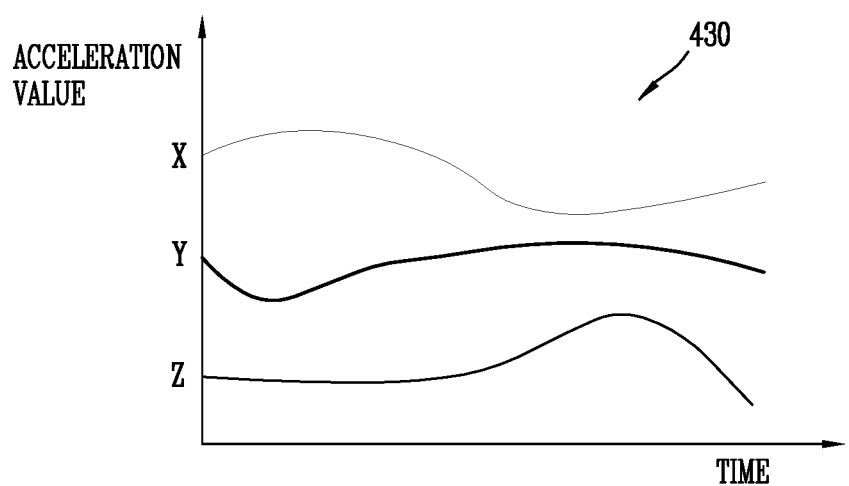
Figure 4B:
Figure 4B:
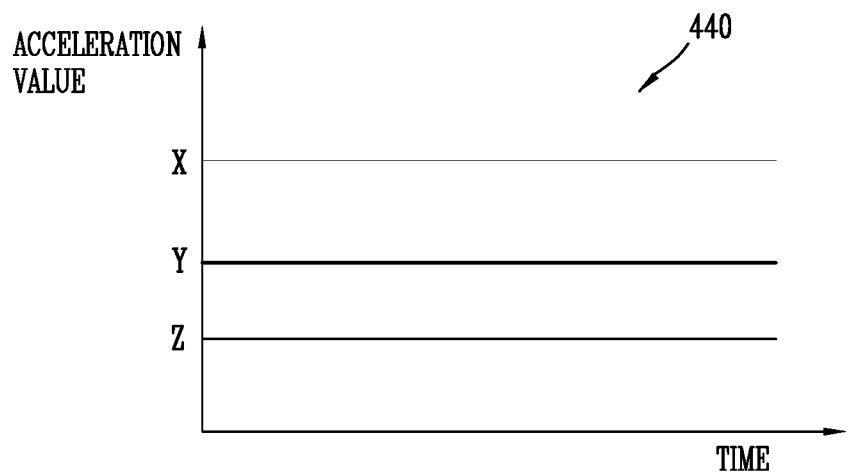
Figure 4C:
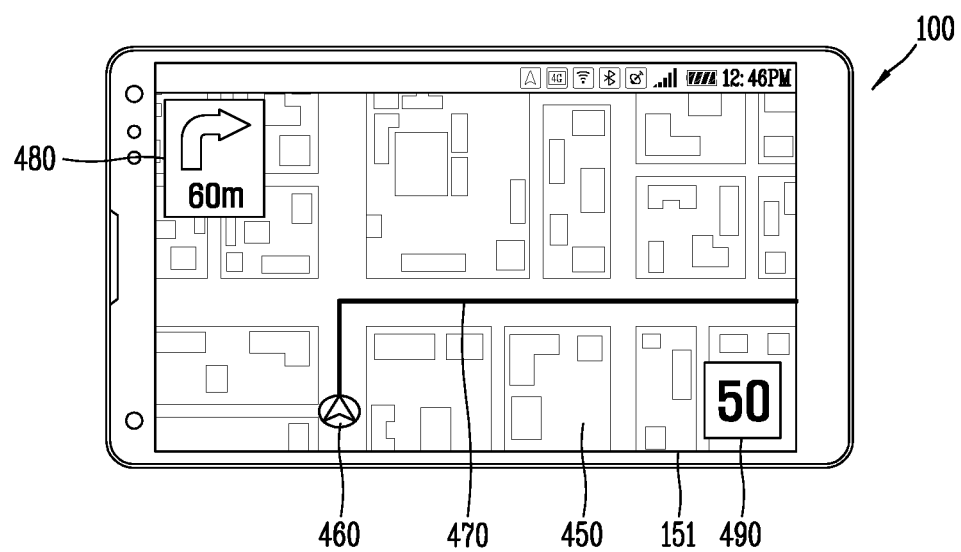

FIGS. 4A, 4B, and 4C are conceptual views illustrating a method of sensing whether or not the vehicle is driving in a state that the mobile terminal is mounted on the vehicle according to an embodiment of the present disclosure.

The camera 121 provided in the mobile terminal 100 of the present disclosure may include a front camera 121a disposed on a front surface of the body and a rear camera 121b disposed on a rear surface of the body.

When the event 300 occurs, the controller 180 may sense whether or not the mobile terminal 100 is mounted on the vehicle 200 and whether or not the vehicle 200 is driving through an image 400a received through the front camera 121a and an image 400b received through the rear camera 121b.

Referring to FIG. 4A, an example of the image 400a received through the front camera 121a is illustrated in FIG. 4A, and an example of the image 400b received through the rear camera 121b is illustrated in FIG. 4B.

The controller 180 may sense a change of an image in a region 410 having a size smaller than a reference size on the image 400a received through the front camera 121a, and a change of an image in a region 420 having a size larger than the reference size on the image 400b received through the rear camera 121b. In this case, the controller 180 may determine that the vehicle 200 is driving while the mobile terminal 100 is mounted on the vehicle 200. The reference size may be determined by user setting or by the control of the controller.

Here, the image 400a received through the front camera 121a may include an image (or graphic object) corresponding to an inside of the vehicle 200. In addition, the image 400a received through the front camera 121a may include an image corresponding to a window of the vehicle.

In other words, the region 410 having a size smaller than the reference size on the image 400a received through the front camera 121a may be a region occupied by an image corresponding to the window of the vehicle.

Meanwhile, the image 400b received through the rear camera 121b may include an image (or graphic object) corresponding to an external appearance of the vehicle 200. The image corresponding to the external appearance of the vehicle may be, for example, an image corresponding to an external appearance located in a forward direction of the vehicle. In other words, the region 420 having a size larger than the reference size on the image 400b received through the rear camera 121b may denote a region in which a region of displaying an image corresponding to a bonnet of the vehicle is excluded from a region occupied by an image corresponding to the external appearance of the vehicle.

When each image is changed in the region 410 having a size smaller than the reference size on the image 400a received through the front camera 121a and in the region 420 having a size larger than the reference size on the image 400b received through the rear camera 121b, the controller 180 may determine that the vehicle 200 is driving in a state that the mobile terminal 100 is mounted on the vehicle 200.

Meanwhile, the controller 180 may sense whether or not the vehicle 200 is driving while the mobile terminal 100 is mounted on the vehicle 200 using various methods.

The mobile terminal 100 of the present disclosure may include a detection unit 140 (sensing unit 140) that senses the movement of the mobile terminal 100. The sensing unit 140 may sense the movement of the mobile terminal 100 using an acceleration sensor, a magnetic sensor, a G-sensor, a gyroscope sensor, and the like.

When the event 300 occurs, the controller 180 may measure an acceleration value sensed according to the movement of the mobile terminal 100, and determine that the mobile terminal 100 is located in a vehicle in a driving state.

On the contrary, as illustrated in a first drawing of FIG. 4B, when a change pattern of an acceleration value sensed according to the movement of the mobile terminal 100 does not correspond to a preset pattern (in case of having an irregular pattern 430), the controller 180 may determine that the mobile terminal 100 is not located in the vehicle in a driving state, and may not activate a gesture function. Here, a case where the change pattern of the acceleration value sensed according to the movement of the mobile terminal 100 has an irregular pattern may be, for example, a case where the user possessing the mobile terminal 100 is walking.

On the other hand, as illustrated in a second drawing of FIG. 4B, when a change pattern of an acceleration value sensed according to the movement of the mobile terminal 100 corresponds to a preset pattern 440, the controller 180 may determine that the mobile terminal 100 is located in a vehicle in a driving state.

Here, the preset pattern may be a case where acceleration values for X, Y, and Z directions at right angles to one another with respect to the mobile terminal have a predetermined value or at least one of acceleration values for X, Y, and Z directions has a pattern that increases or decreases at a specific slope.

Then, when it is determined that the mobile terminal 100 is located in the vehicle 200 in a driving state, the controller 180 may activate the camera 121 to sense a state in which the mobile terminal 100 is mounted on the vehicle 200.

Specifically, when a change pattern of the acceleration value sensed according to the movement of the mobile terminal 100 corresponds to a preset pattern, the controller 180 activates either one of the front and the rear camera 121a, 121b, and activate a gesture function based on a change of at least part of an image received through the either one of cameras.

For an example, one of the cameras may be the rear camera 121b. In other words, as illustrated in a second drawing of FIG. 4A, the gesture function 310 may be activated based on a change of an image in the region 420 having a size larger than the reference size on the image 400b received through the rear camera 121b.

Though not shown in the drawing, the either one of the cameras may be the front camera 121a. In this case, the gesture function 310 may be activated based on a change of an image in the region 410 having a size smaller than the reference size on the image 400a received through the front camera 121a as illustrated in a second drawing of FIG. 4A.

Furthermore, when it is determined that the mobile terminal 100 is located in the vehicle 200 in a driving state through the sensing unit 140, the controller 180 may activate both the front and the rear camera 121a, 121b, and determine that the mobile terminal 100 is mounted on the vehicle 200 in a driving state based on an image received from each of the cameras 121a, 121b.

On the other hand, the controller 180 may determine that the user is driving based on an application being carried out on the mobile terminal 100.

For example, as illustrated in FIG. 4C, as a navigation function is carried out on the display unit 151, an execution screen 450 associated with the navigation function may be displayed. The execution screen 450 associated with the navigation function includes at least one of map information, location information 460 of the mobile terminal 100, route information 470, guide information 480 associated with the route information, and traveling speed information 490 of the mobile terminal 100 (corresponding to a driving speed of the vehicle).

The controller 180 may determine that the user is driving when the navigation function 450 is being executed when the event 300 occurs.

On the other hand, even when the navigation function 450 is being executed in the mobile terminal 100, the user of the mobile terminal 100 may be a passenger other than a driver. When the user of the mobile terminal 100 is not a driver, the gesture function may not be activated.

Therefore, the present disclosure may determine whether or not the user of the mobile terminal 100 is driving based on whether or not the vehicle 200 is driving in a state that the mobile terminal 100 is mounted on the vehicle 200 through at least one combination of the descriptions (conditions) illustrated in FIGS. 4A through 4C.

Through the foregoing configuration, when an event occurs, the present disclosure may activate a gesture function 310 only when it is determined that the user is driving, thereby reducing battery consumption.

Hereinafter, a method of notifying that a gesture function is activated in case where a user is in a driving state when an event occurs will be described in detail with reference to the accompanying drawings.

Figure 5B:
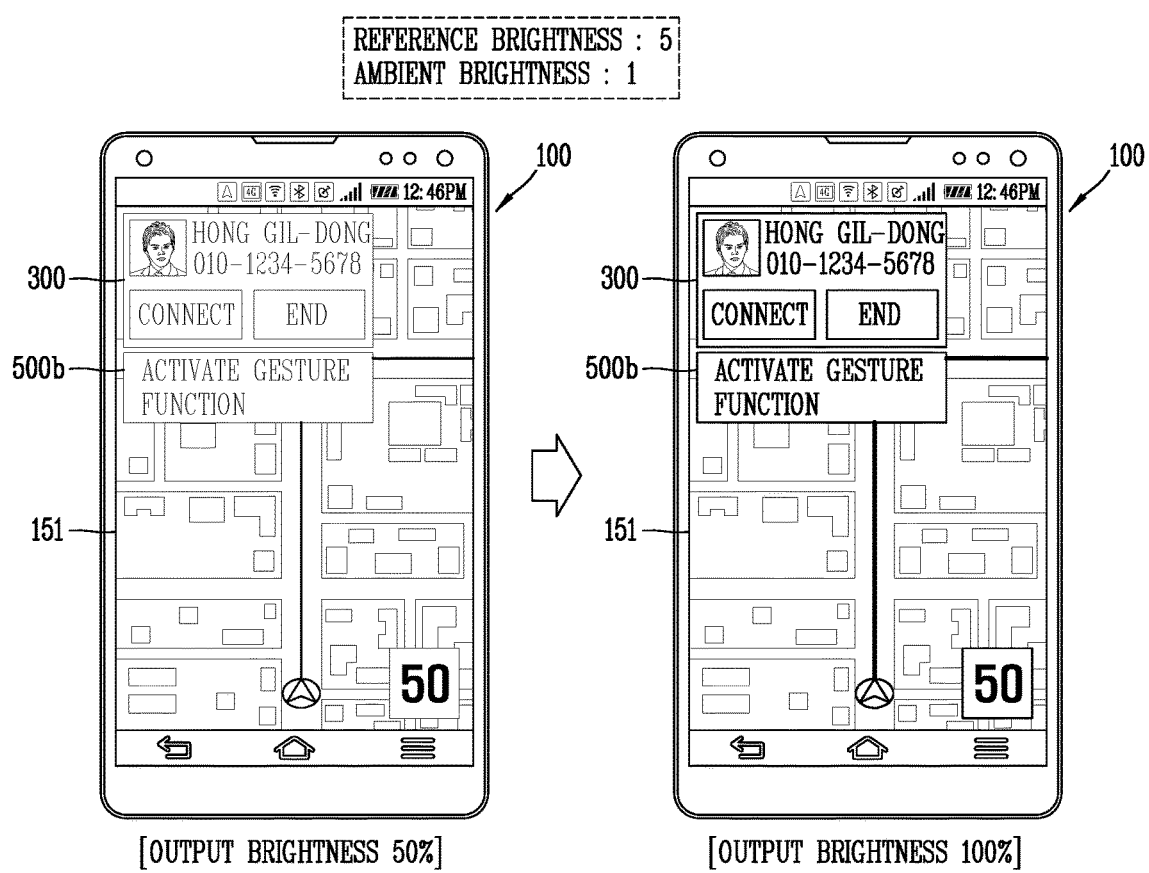

FIGS. 5A and 5B are conceptual views for explaining notification information for notifying that a gesture function has been activated according to an embodiment of the present disclosure.

As described above, when the event 300 occurs, the controller 180 may activate the gesture function 310 when it is determined that the vehicle 200 is driving in a state that the mobile terminal 100 is mounted on the vehicle 200.

For example, as illustrated in a first drawing of FIG. 5A, when the event 300 occurs, the screen information 300 associated with the event 300 may be displayed on the display unit 151.

Then, as illustrated in a second drawing of FIG. 5A, when it is determined that the vehicle 200 is driving while the mobile terminal 100 is mounted on the vehicle 200 at the time of the occurrence of the event 300, the controller 180 may activate the gesture function 310, and display notification information 500a, 500b for notifying that the gesture function 310 has been activated.

The notification information 500a, 500b may be displayed in the form of a graphic object (text, image, icon, etc.) 500a on the display unit 151 or may be output in the form of a sound 500b through the audio output unit 152.

Meanwhile, the sensing unit 140 of the present disclosure may sense ambient environment information surrounding the mobile terminal 100. Specifically, the sensing unit 140 may sense a brightness around the mobile terminal 100 using at least one of the illumination sensor 142 and the optical sensor (for example, camera (refer to reference numeral 121)).

Here, when the gesture function 310 is activated, the controller 180 may increase an output brightness of the display unit 151 when it is determined that the surrounding of the mobile terminal is darker than a reference brightness through the sensing unit 140.

For example, as illustrated in a first drawing of FIG. 5B, when activating the gesture function 310, the controller 180 may increase an output brightness of the display unit 151, as illustrated in a second drawing of FIG. 5B, where it is determined that the ambient brightness (for example, 1) of the mobile terminal is darker than the reference brightness (for example, 5).

Through the foregoing configuration, the present disclosure may notify the user that a gesture function has been activated, and increase an output brightness of the display unit 151 when the surrounding of the mobile terminal 100 is dark, thereby increasing a recognition rate of an object (for example, a user's hand) to which a gesture is to be applied.

Hereinafter, a method of notifying the recognition of an object to which a gesture is to be applied subsequent to the activation of a gesture function will be described in detail with reference to the accompanying drawings.

Figure 6A:
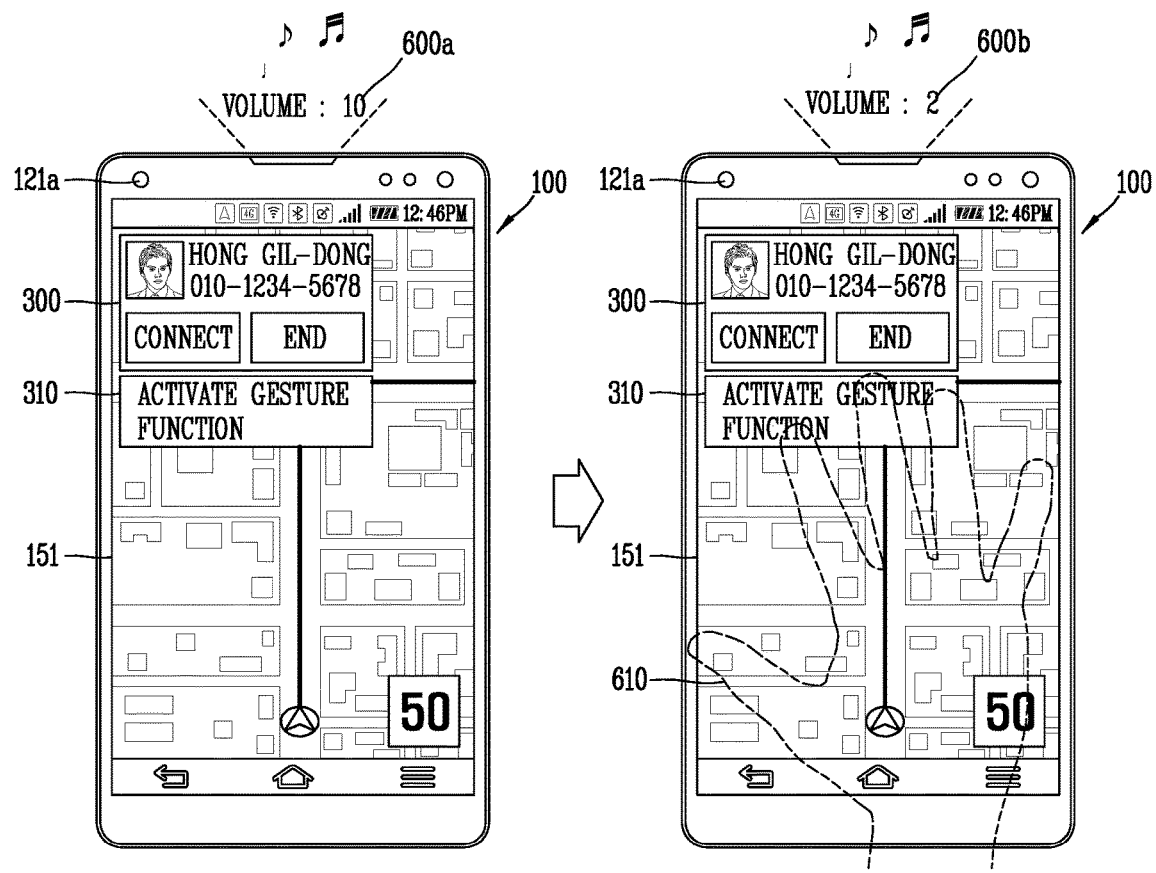
FIGS. 6A and 6B are conceptual views for explaining a method of controlling a mobile terminal when an object to which a gesture according to an embodiment of the present disclosure is to be applied is identified.
Figure 6B:
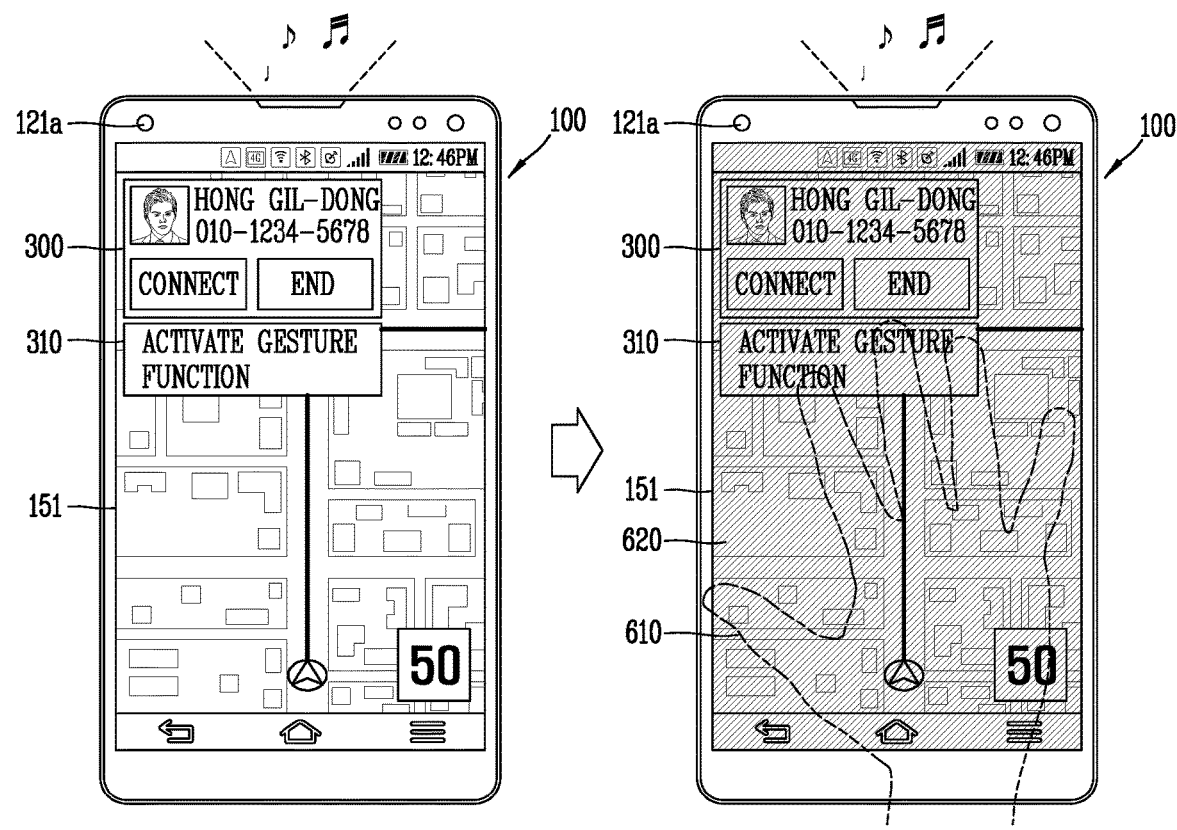

FIGS. 6A and 6B are conceptual views for explaining a method of controlling a mobile terminal when an object to which a gesture is to be applied is identified according to an embodiment of the present disclosure.

The mobile terminal 100 according to an embodiment of the present disclosure may include the audio output unit 152. When the event 300 occurs, the controller 180 may output a notification sound for notifying that an event has occurred through the audio output unit 152.

Here, the controller 180 may change a volume of the notification sound when the activation button 310 is activated based on whether the vehicle 200 is driving while the mobile terminal 100 is mounted on the vehicle 200 in a state that the notification sound is output based on the occurrence of the event, and then a preset object 610 (for example, a user's hand) to which a gesture is to be applied is sensed.

For example, when the user's hand 610 is recognized subsequent to the activation of the gesture function 310, the controller 180 may change a volume of the notification sound to guide that the hand 610 has been recognized.

Here, when the gesture function 310 is activated, the controller 180 may activate the camera 121 (for example, the front camera 121a), and determine whether or not the user's hand 610 has been recognized using an image received through the camera 121.

When the user's hand 610 is recognized, the controller 180 may change a volume (or output level) of the notification sound as illustrated in a first and a second drawing of FIG. 6A. For example, the volume of the notification sound may be changed from a first size 600a to a second volume 600b smaller than the first size.

On the other hand, though not shown in the drawing, when the preset object 610 (for example, user's hand) is recognized, as illustrated in FIG. 5A, the controller 180 may display notification information on the display unit 151 or output the notification information through the audio output unit 152.

Furthermore, as illustrated in FIG. 6B, when the preset object 610 is recognized, the controller 180 may change a display state of the display unit 151. For example, as illustrated in a second drawing of FIG. 6B, the controller 180 may change an output brightness 620 of the display unit 151 or apply a graphic effect (for example, blinking) to screen information displayed on the display unit 151 to guide that the preset object 610 has been recognized.

Through the foregoing configuration, the user may receive a feedback on whether or not an object (his/her own hand) for taking a gesture has recognized (identified) on the mobile terminal.

Hereinafter, a method of controlling an event using a gesture when a vehicle is driving in a state in which a mobile terminal is mounted on the vehicle during the occurrence of the event on the mobile terminal according to the present disclosure will be described in more detail with reference to the accompanying drawings.

FIGS. 7A, 7B, 7C, 7D and 7E are conceptual views illustrating a method of performing a preset function based on a gesture.

When a gesture function 310 is activated based on an event 300, the controller 180 may control the event 300 based on the recognition of a preset gesture 320.

Specifically, the controller 180 performs a first function associated with the event when a first gesture 320a is recognized among preset gestures, and perform a second function different from the first function associated with the event when a second gesture 320b different from the first gesture is recognized among the preset gestures.

Here, the gesture 320 may denote an operation (action, movement) of the recognized object 610. Specifically, when a preset object 610 is recognized using an image received through the camera 121, and the recognized object 610 takes a gesture (action, behavior, movement, etc.), the controller 180 may recognize the gesture 320 of the object 610 based on a change of a graphic object corresponding to the object 610 in the image.

In other words, when the gesture function 310 is activated, the controller 180 may recognize the user's hand 610 from an image received through the camera, and determine whether or not a gesture of the hand corresponds to the preset gesture.

Then, the controller 180 may perform a function associated with the preset gesture based on the recognized gesture 320 corresponding to the preset gesture.

Figure 7A:
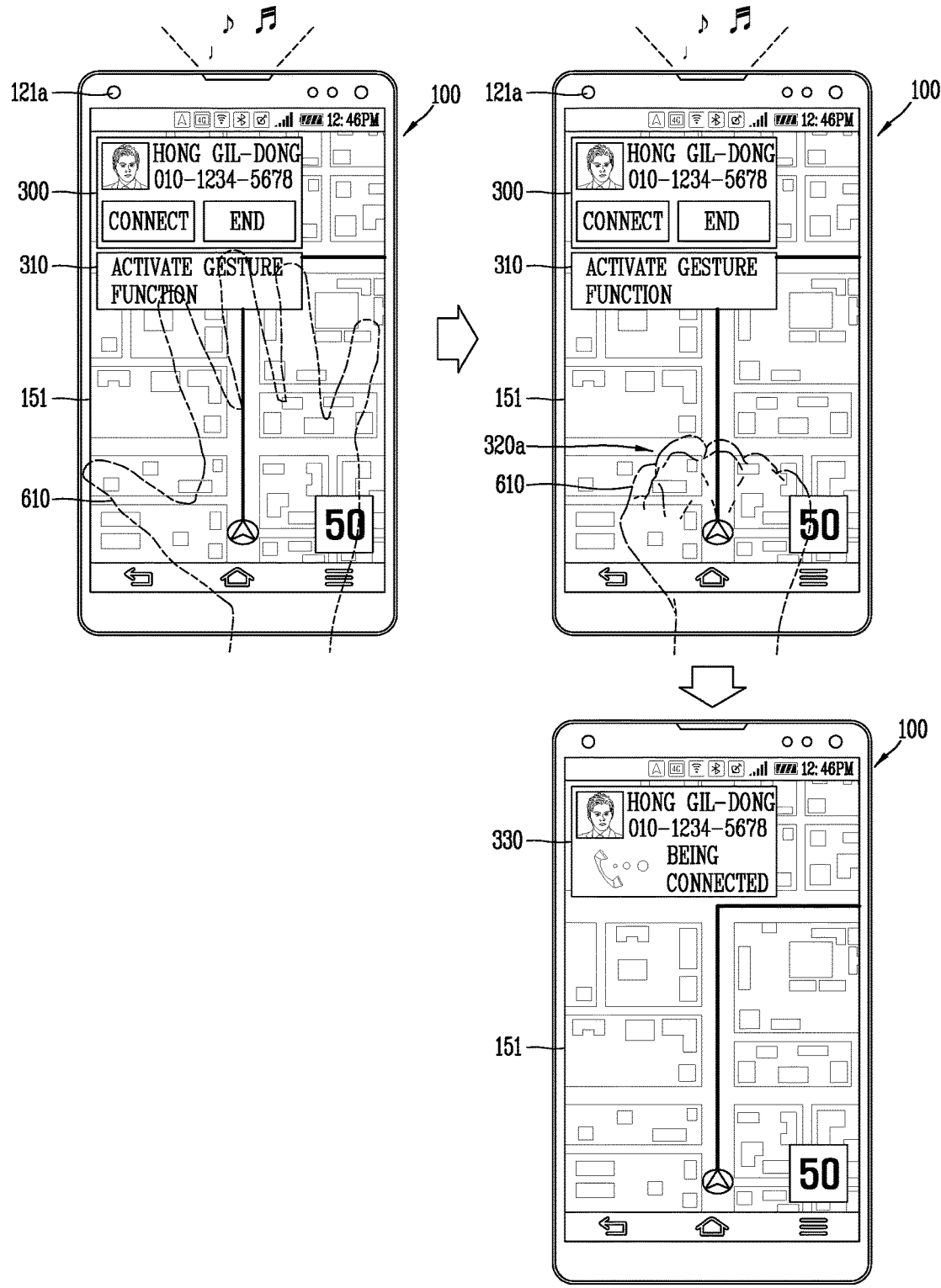
FIGS. 7A, 7B, 7C, 7D, and 7E are conceptual views illustrating a method of performing a preset function based on a gesture.

For example, the controller 180 may activate the gesture function 310 when a call is received (when an event occurs) as illustrated in a first drawing of FIG. 7A. Subsequent to the activation of the gesture function 310, when the user's hand (preset object) 610 is recognized, and then a gesture 320a of grabbing the hand in a state that the hand 610 is open is sensed as illustrated in a second drawing of FIG. 7A, the controller 180 may connect (330) the received call 300 as illustrated in a third drawing of FIG. 7A.

Figure 7B:
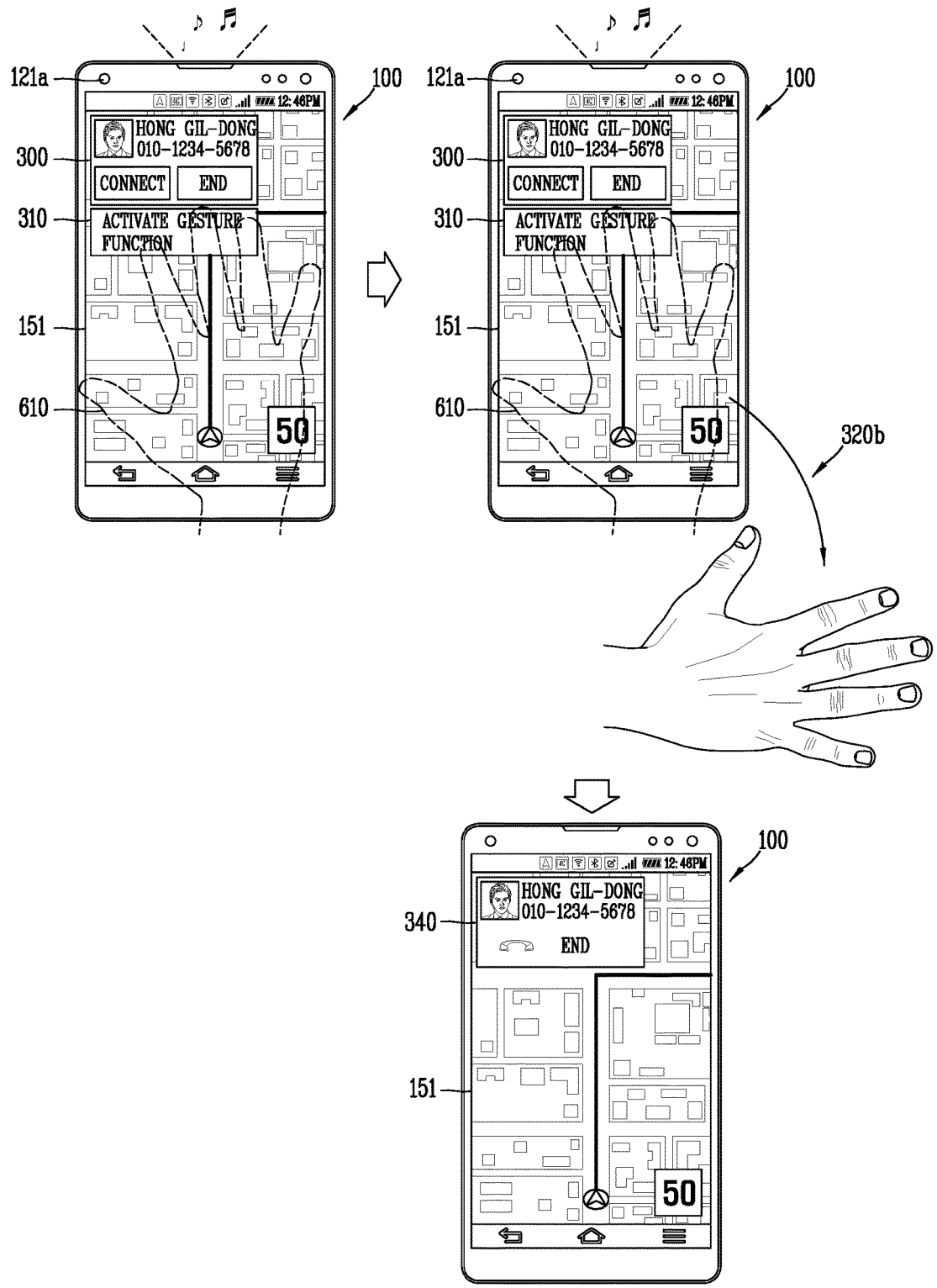

For another example, the controller 180 may activate the gesture function 310 when a call is received as illustrated in a first drawing of FIG. 7B. Then, as illustrated in a second drawing of FIG. 7B, when a gesture 320b getting out of a range capable of allowing the mobile terminal 100 to recognize the hand is applied instead of the gesture 320a of grabbing the hand in a state that the recognized user's hand 610 is open, the controller 180 may terminate (340) the received call 300 as illustrated in a third drawing of FIG. 7B.

On the other hand, when the call is connected in a state that the vehicle 200 is driving while the mobile terminal 100 is mounted on the vehicle 200, the controller 180 may connect the call in a speaker mode.

Here, the speaker mode may denote a mode of performing a call in a state that the mobile terminal 100 is spaced apart from the user by a predetermined distance. In the speaker mode, a volume of sound output through the audio output unit 152 and a sensitivity at which a sound is received through the microphone 122 may be increased as compared to a normal mode other than the speaker mode.

At this time, when the call is connected based on a gesture, the controller 180 may control a volume of sound to be different output through the audio output unit 152 based on a size of the object (for example, user's hand 610) for taking the gesture.

Figure 7C:
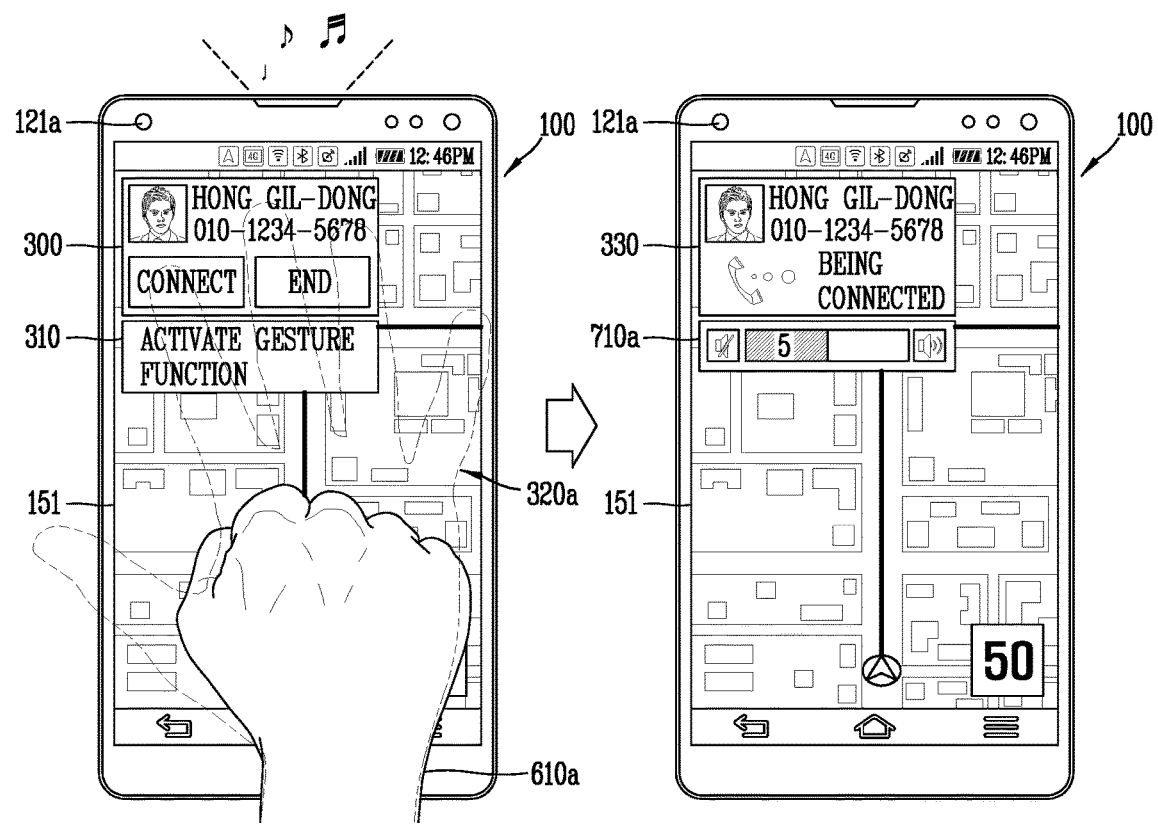

For example, when a call is received (300), the controller 180 may recognize a preset gesture 320a in a state that a size of the user's hand 610 is recognized as a first size 610a as illustrated in a first drawing of FIG. 7C. The controller 180 may connect (330) the received phone 310 based on the preset gesture 320a. Here, the telephone connection mode may be a speaker mode.

At this time, the controller 180 may set a volume of the audio output unit to a first level 710a based on whether the size of the hand 610 is the first size 610a.

Figure 7D:
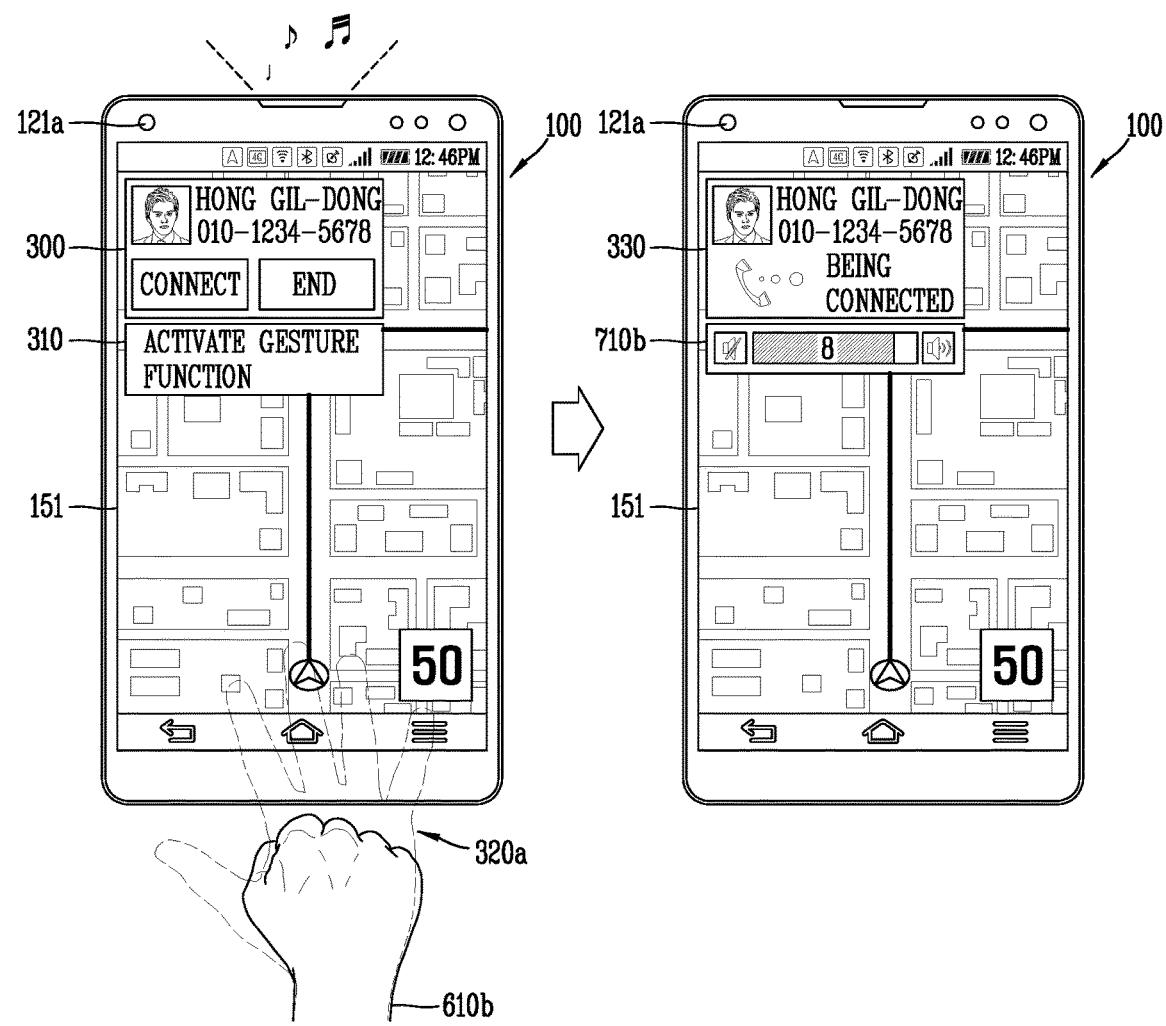

For another example, when receiving a call (300), the controller 180 may recognize a preset gesture 320a in a state that the size of the user's hand 610 is recognized as a second size 610b smaller than the first size as illustrated in a first drawing of FIG. 7D. The controller 180 may connect the received call 310 in a speaker mode 330 based on the preset gesture 320*a*.

At this time, the controller 180 may set a volume of the audio output unit to a second level 710*b* greater than the first level 710*a* based on whether the size of the hand 610 is a second size 610*b* smaller than the first size 610*a*.

Through the foregoing configuration, according to the present disclosure, a volume of the audio output unit may be set to a first level when the gesture is applied by a user in a driving state (the size of the hand is a first size), and the volume of the audio output unit may be set to a second level greater than the first level when the gesture is applied by another person seated in a rear seat (the size of the hand is a second size smaller than the first size).

Likewise, the controller 180 may control a voice reception sensitivity of the microphone to be different based on a size of the object (for example, user's hand) to which the gesture is applied. For example, the controller 180 may sensitively control the voice reception sensitivity of the microphone as the size of the user's hand 610 decreases.

However, the present disclosure is not limited thereto, and it may be possible to set a volume of the audio output unit to decrease or control the voice reception sensitivity of the microphone to be insensitive as the size of the user's hand decreases according to user setting.

On the other hand, when a preset gesture is sensed again in the state where the call is connected (330), the controller 180 may terminate the connected call. For example, when the received call 300 is connected (330) based on a preset gesture 320*a*, the controller 180 may terminate the connected call 330 based on whether the preset gesture 320*a* is applied again.

Figure 7E:
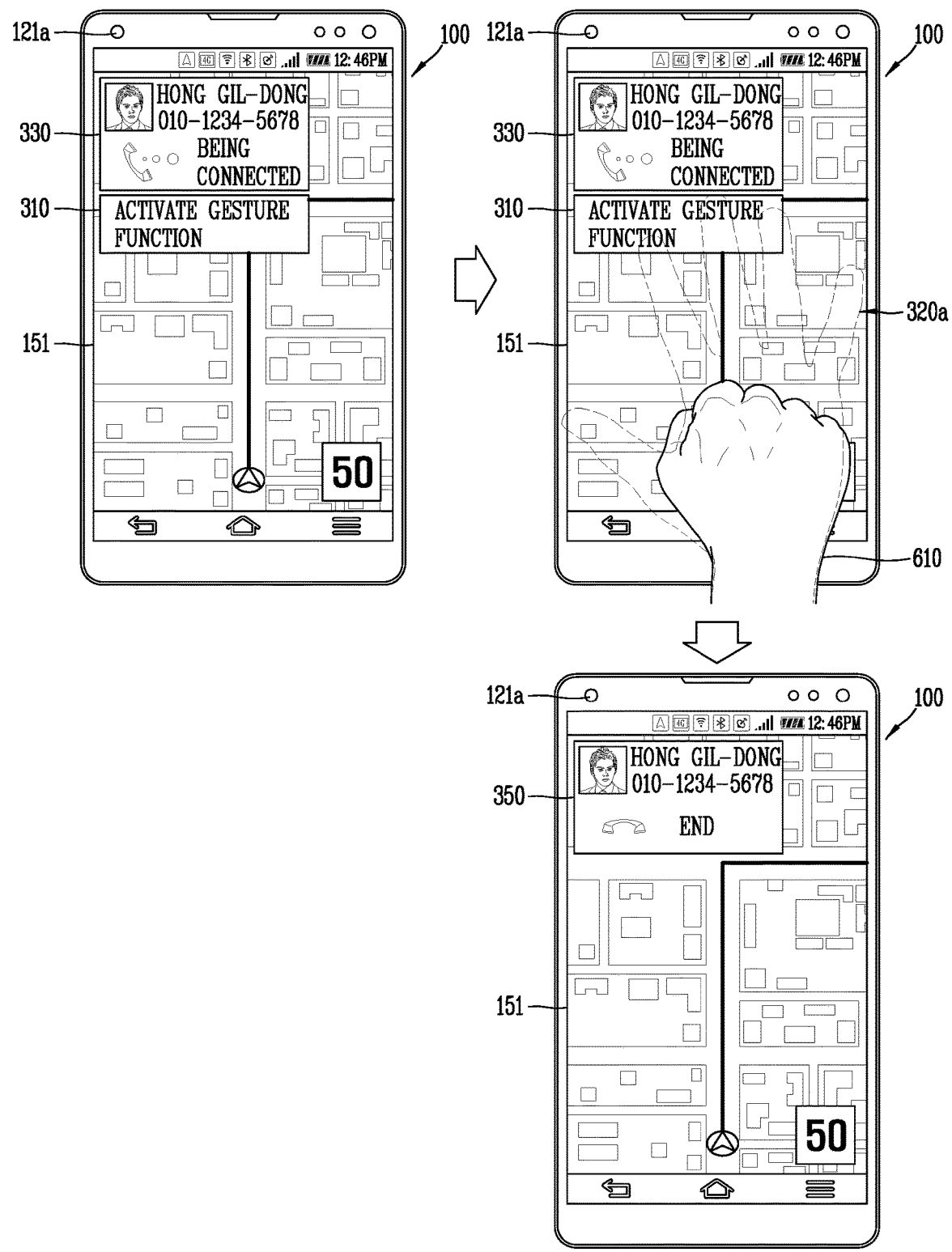

As illustrated in a first drawing of FIG. 7E, when a call is connected (330), the controller 180 may maintain the activated gesture function 310. Then, the controller 180 may sense a gesture preset by the user's hand 610 (a gesture for connecting the received call) in a state that the call is connected (330) as illustrated in a second drawing of FIG. 7E. Then, the controller 180 may terminate (350) the connected phone 330 based on the sensing of the preset gesture 320*a* as illustrated in a third diagram of FIG. 7E. At this time, the activated gesture function 310 may be switched to an inactive state based on the termination of the connected call (termination of an event).

Through the foregoing configuration, when the user of the mobile terminal is driving, the event may be controlled only by a gesture having only a minimal effect on the user's gaze and operation, thereby significantly reducing the accident rate.

Figure 8A:
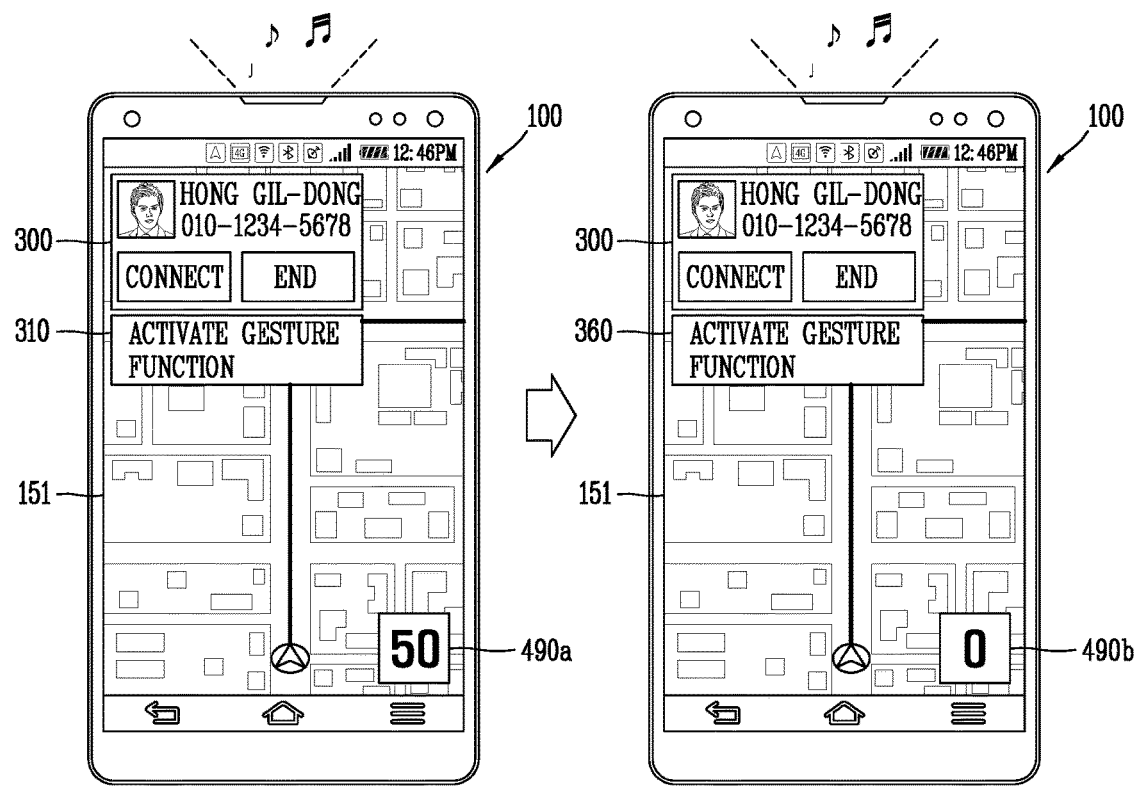
FIGS. 8A and 8B are conceptual views for explaining a method of switching an activated gesture function to an inactive state.
Figure 8B:
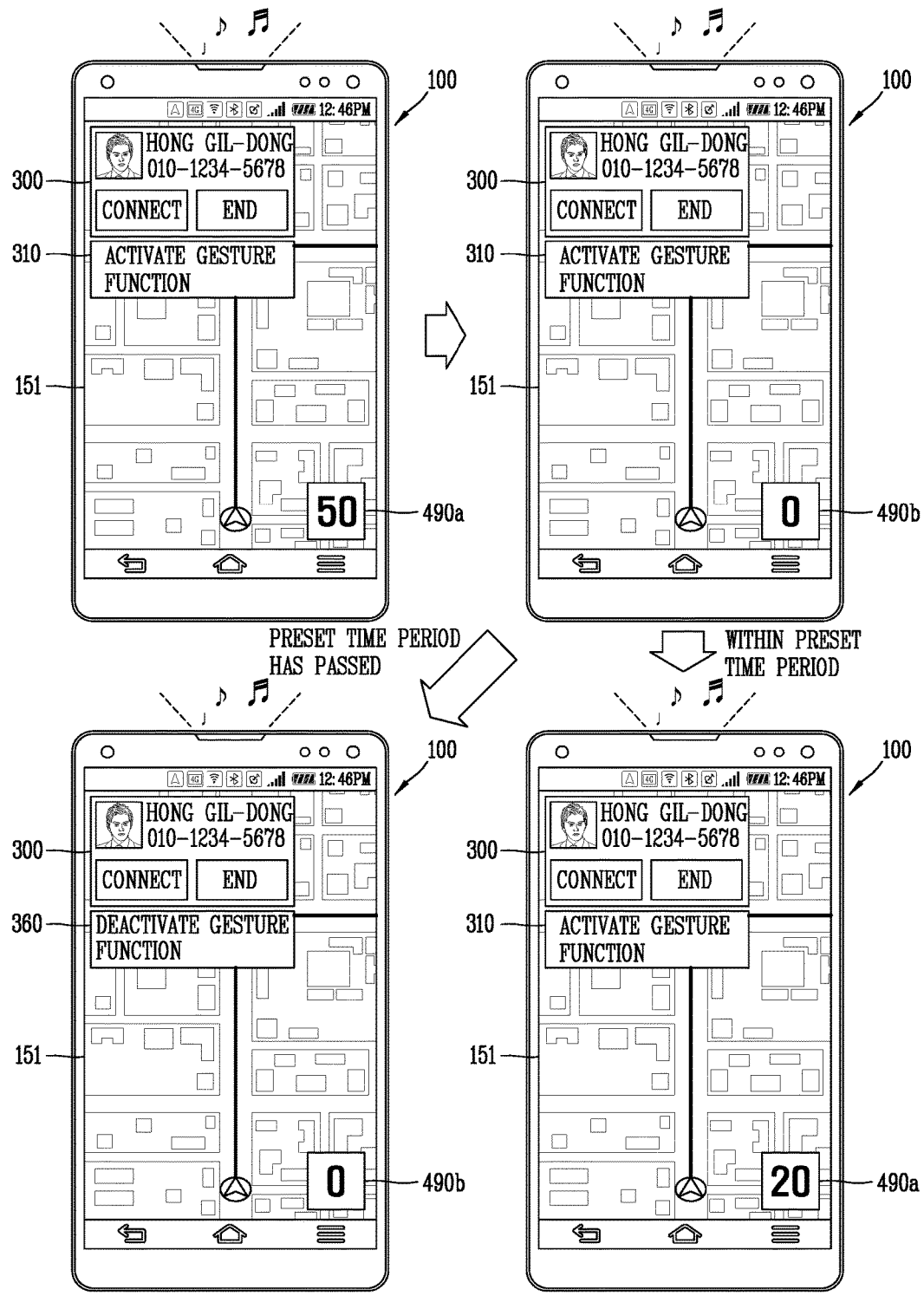

Hereinafter, a method of switching an activated gesture function to an inactive state in the present disclosure will be described in detail with reference to the accompanying drawings. FIGS. 8A and 8B are conceptual views for explaining a method of switching an activated gesture function to an inactive state.

First of all, as described above, the activated gesture function may be switched to an inactive state based on the termination of the event 300.

Meanwhile, the controller 180 may switch a gesture function to an inactive state based on whether the mobile terminal 100 satisfies a preset condition in a state that the gesture function is activated (310).

For example, when the event occurs (300) in a state that the vehicle 200 is driving (490*a*) as illustrated in a first diagram of FIG. 8A, the controller 180 may switch the activated gesture function 310 to an inactive state (360) based on whether the vehicle 200 mounted with the mobile terminal 100 is stopped (490*b*) as illustrated in a second diagram of FIG. 8A.

Meanwhile, when the event occurs (300), the controller 180 may maintain a gesture function in an active state for a preset period of time even when the vehicle mounted with the mobile terminal 100 is stopped while driving.

For example, the activated gesture function 310 may maintain an active state 310 even when the vehicle 200 mounted with the mobile terminal 100 is stopped (490*b*) as illustrated in a first and a second drawing of FIG. 8B. Then, the activated gesture function 310 may continuously maintain an active state as illustrated in a third drawing of FIG. 8B when the vehicle 200 is changed to a driving state again before a preset period of time has passed from the stopped state 490 of the vehicle.

On the contrary, as illustrated in a fourth drawing of FIG. 8B, when the state in which the vehicle 200 mounted with the mobile terminal 100 is stopped (490*b*) is maintained for a preset period of time, the activated gesture function 310 may be switched to an inactive state 360.

Here, the preset period of time may be determined by the user's setting or by the control of the controller. For an example, the preset period of time may be determined based on an amount of battery consumed to keep the gesture function in an active state over time, and an amount of battery consumed to sense whether or not the mobile terminal is mounted on the vehicle and whether or not the vehicle is driving. In this case, the preset time may be set to a period of time shorter than a value obtained by dividing an amount of battery consumed to sense whether or not the mobile terminal is mounted on the vehicle and whether or not the vehicle is driving by an amount of battery consumed to keep the gesture function in an active state over time.

On the other hand, referring to FIGS. 8A and 8B, it has been described that the activated gesture function is switched to an inactive state based on whether the vehicle mounted with the mobile terminal is stopped when an event occurs or whether or not a preset period of time has passed from the stopped point, but the present disclosure is not limited thereto, and the above description may be applied in the same or similar manner based on whether the vehicle mounted with the mobile terminal enters a state of traveling below a reference speed.

Through the foregoing configuration, the present disclosure may switch the activated gesture function to an inactive state based on whether the mobile terminal satisfies a preset condition, thereby reducing battery consumption. In addition, according to the present disclosure, the activate gesture function may be maintained for a preset period of time, thereby saving the battery unnecessarily consumed to sense whether or not the mobile terminal is mounted in the vehicle and whether or not the vehicle is driving when the vehicle mounted with mobile terminal 100 is stopped for a period of time shorter than a preset time period due to congestion or stopped for a period of time shorter than a preset time period due to a signal.

Hereinafter, a method of controlling an event in response to a gesture according to another embodiment of the present disclosure will be described in detail with reference to FIGS. 9A and 9B.

The mobile terminal of the present disclosure may display an execution screen associated with a navigation function in a HUD mode 751. The HUD mode 751 may be a mode for displaying screen information displayed on the display unit 151 of the mobile terminal 100 on a windshield of the vehicle.

When the HUD mode is set according to a user request, the controller 180 may vertically or horizontally reverse screen information displayed on the display unit 151. Accordingly, the screen information displayed on the display unit 151 may be reflected on the windshield (HUD) of the vehicle.

Figure 9A:
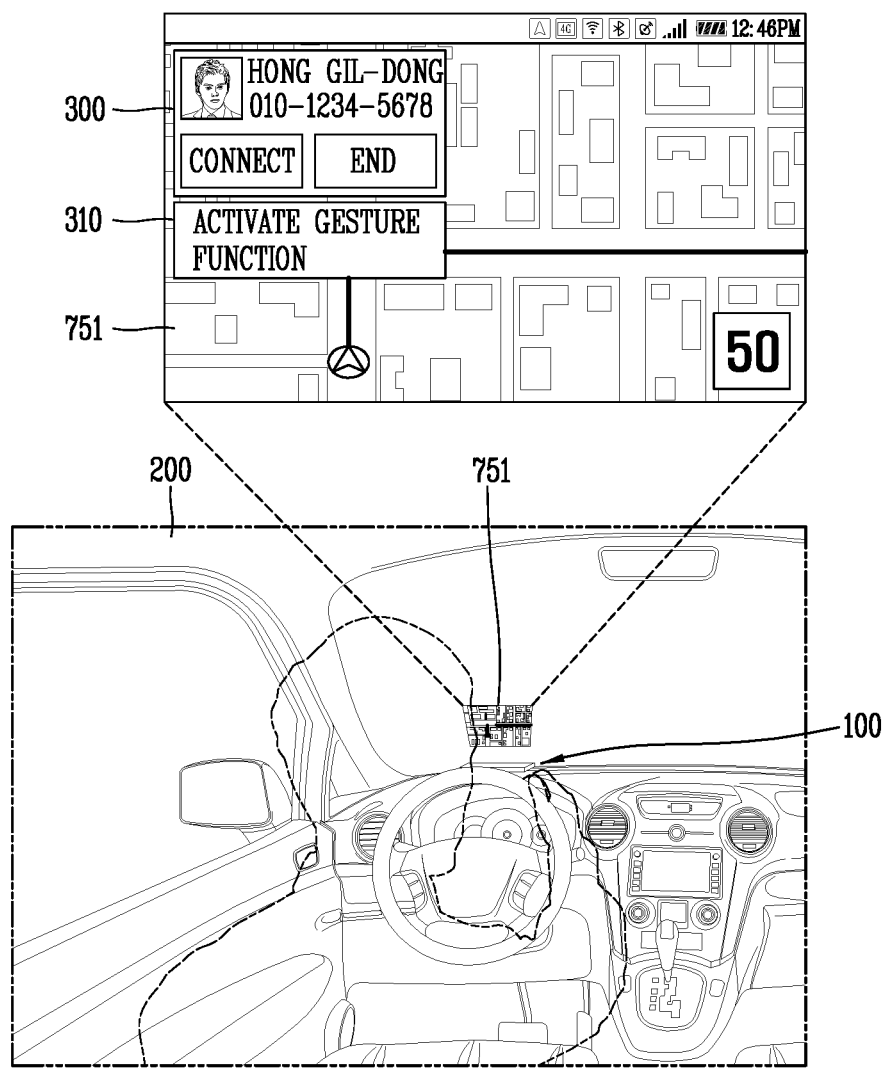
FIGS. 9A and 9B are conceptual views illustrating a method of controlling an event in response to a gesture according to an embodiment of the present disclosure.

In other words, the mobile terminal 100 may be mounted around the windshield of the vehicle to display in the HUD mode 751 as illustrated in FIG. 9A.

In this state, when the event 300 occurs, the controller 180 may sense whether or not the vehicle is driving, namely, whether or not the user is in a driving state, in a state that the mobile terminal 100 is mounted on the vehicle.

For example, the controller 180 may determine that the user is in a driving state based on the movement of the mobile terminal being sensed in a state in which a navigation function is carried out in the HUD mode.

For another example, the controller 180 may sense whether or not the user is in a driving state based on an image received through at least one of the front camera 121a and the rear camera 121b. The controller 180 may determine that the user is in a driving state based on whether a graphic object (image) corresponding to screen information displayed on the first vane 151 is included in an image received through the front camera 121a, and at least part of the image received through the front camera 121a is changed.

For still another example, the controller 180 may determine that the user is in a driving state when a graphic object corresponding to screen information displayed on the display unit 151 is included in an image received through the front camera 121a in a state that it is determined that the mobile terminal 100 is located in a vehicle in a driving state using an acceleration sensor or GPS module.

Furthermore, the controller 180 may analogically apply the description illustrated in FIGS. 4A through 4C to sense whether or not the vehicle is driving in a state that the mobile terminal 100 is mounted on the vehicle 200.

The controller 180 may activate (310) a gesture function based on the sensed (determination) result described above.

Then, the controller 180 may control the occurred event 300 based on the sensing of a preset gesture. For example, the preset gesture may be a gesture in which the user's hand 610 knocks on a portion of the vehicle a preset number of times within a reference time or a gesture of grabbing the user's hand from an open hand state sensed on a front surface of the mobile terminal 100 as illustrated in FIG. 9B.

Here, when the hand 610 takes a gesture 320c of knocking on a portion of the vehicle a preset number of times within a reference time, the controller 180 may control the event 300 based on a sound generated according to the gesture 320c.

Figure 9B:
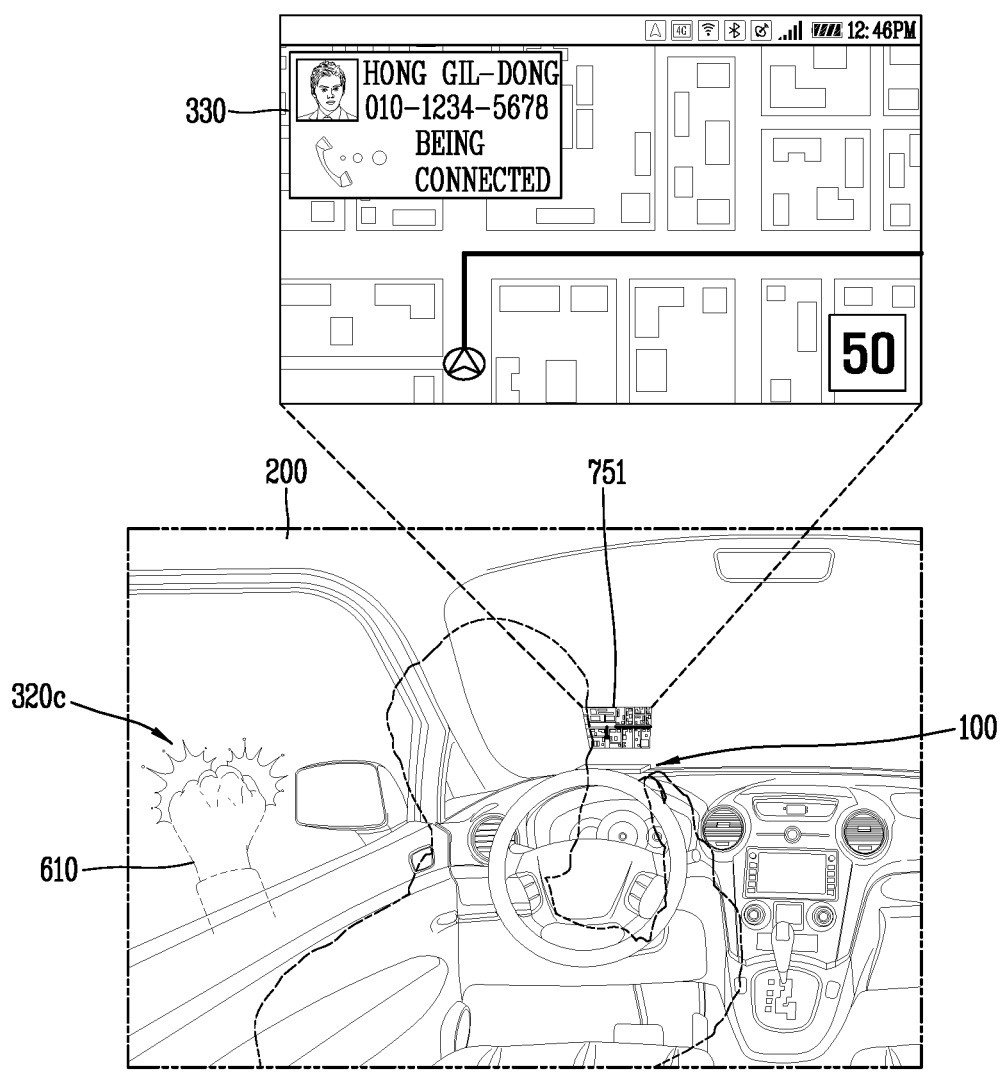

Then, as illustrated in FIG. 9B, the controller 180 may control (330) (for example, connect) the occurred event 300 (for example, an incoming call) based on the preset gesture being applied thereto.

The foregoing description may be analogically applied to a telematics terminal provided in a vehicle as well as a mobile terminal in the same or similar manner.

The telematics terminal may include at least one of the components described in FIG. 1A. Specifically, the telematics terminal includes a front camera installed to face the user, a rear camera installed to face the front of the vehicle, a display unit (touch screen), an audio output unit (speaker), a microphone, a sensing unit, a controller, and the like, and the description illustrated in FIGS. 1A through 9B may be analogically applied in the same or similar manner through the foregoing configuration(s).

As described above, the present disclosure may sense whether or not a vehicle is driving in a state that the mobile terminal is mounted on the vehicle when an event occurs, and activate a gesture function based on whether the vehicle is driving in a state that the mobile terminal is mounted on the vehicle. Therefore, the present disclosure may activate a gesture function only when an event occurs and when a user is driving, thereby reducing the battery consumption.

In addition, the present disclosure may recognize a gesture of a user to control an event when the user of the mobile terminal is driving at the time of the occurrence of the event. Through this, the user may control the event without losing sight while driving, thereby significantly reducing the accident rate.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), SDD (Silicon DisckDrive), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   an audio output unit;
   a microphone;
   a camera; and
   a controller configured to activate the camera when an event occurs, and sense whether or not the mobile terminal is mounted on a vehicle and whether or not the vehicle is driving using an image received through the camera, and recognize a gesture of a user to activate a gesture function for controlling the event when it is determined that the vehicle is driving in a state that the mobile terminal is mounted on the vehicle according to the sensed result,
   wherein when a call is received, the controller is further configured to:
      activate the gesture function,
      recognize a hand of the user from an image received through the camera, and
      connect the received call when a gesture of the hand corresponds to a preset gesture,
   wherein when the received call is connected based on the gesture of the hand, the controller is further configured to:
      control a volume of the audio output unit to be set differently based on a size of the recognized hand taking the preset gesture,
      set the volume of the audio output unit to a first level when the size of the recognized hand taking the same preset gesture is a first size, and
      set the volume of the audio output unit to a second level greater than the first level when the size of the recognized hand taking the same preset gesture is a second size smaller than the first size, and
   wherein the controller is further configured to:

control a voice reception sensitivity of the microphone to be different based on the size of the recognized hand taking the same preset gesture, and
increase the voice reception sensitivity of the microphone as the size of the recognized hand taking the same preset gesture decreases.

2. The mobile terminal of claim 1, wherein the camera comprises a front camera disposed on a front surface of a body of the mobile terminal and a rear camera disposed on a rear surface of the body,
wherein the controller senses whether or not the mobile terminal is mounted on the vehicle and whether or not the vehicle is driving using an image received through the front camera and an image received through the rear camera when the event occurs.

3. The mobile terminal of claim 2, wherein the controller determines that the vehicle is driving in a state that the mobile terminal is mounted on the vehicle based on a change of an image in a region having a size smaller than a reference size on the image received through the front camera, and a change of an image in a region having a size larger than the reference size on the image received through the rear camera.

4. The mobile terminal of claim 2, further comprising:
a sensing unit configured to sense the movement of the mobile terminal,
wherein the controller activates either one of the front and the rear camera when a change pattern of an acceleration value sensed according to the movement of the mobile terminal corresponds to a preset pattern, and activates the gesture function based on a change of at least part of an image received through the either one camera.

5. The mobile terminal of claim 4, wherein the either one camera is a rear camera, and
the gesture function is activated based on a change of an image in a region having a size larger than a reference size on the image received through the rear camera.

6. The mobile terminal of claim 1, wherein when the gesture function is activated, the controller outputs notification information indicating that the gesture function has been activated.

7. The mobile terminal of claim 1, further comprising:
a display unit; and
a sensing unit configured to sense ambient environment information surrounding the mobile terminal,
wherein the controller increases an output brightness of the display unit when it is determined that the surrounding of the mobile terminal is darker than a reference brightness through the sensing unit during the activation of the gesture function.

8. The mobile terminal of claim 1, wherein the controller outputs an alarm sound indicating that the event has occurred through the audio output unit, and changes a volume of the alarm sound to guide the recognition of the hand of the user when the hand is recognized after the activation of the gesture function.

9. The mobile terminal of claim 1, wherein the controller controls the event based on the recognition of a preset gesture.

10. The mobile terminal of claim 9, wherein the controller performs a first function associated with the event when a first gesture is recognized among preset gestures, and performs a second function different from the first function associated with the event when a second gesture different from the first gesture is recognized among the preset gestures.

11. The mobile terminal of claim 10, wherein the controller determines whether or not a gesture of the hand corresponds to the first or second gestures.

12. The mobile terminal of claim 10, wherein when the event is an incoming call, the first function associated with the event is a function of connecting the incoming call, and the second function associated with the event is a function of terminating the incoming call.

13. The mobile terminal of claim 12, wherein the controller terminates the connected call when the first gesture is sensed again when the call is connected.

14. The mobile terminal of claim 1, wherein the controller switches the gesture function to an inactive state based on whether the mobile terminal satisfies a preset condition in a state that the gesture function is activated.

15. The mobile terminal of claim 14, wherein the controller switches the activated gesture function to an inactive state based on whether a vehicle mounted with the mobile terminal is stopped.

16. The mobile terminal of claim 15, wherein the activated gesture function is switched to an inactive state after a preset period of time has passed even when the vehicle mounted with the mobile terminal is stopped, and maintains an active state when the vehicle is changed again to a driving state before the preset period of time has passed in a state that the vehicle is stopped.

17. A method of controlling a mobile terminal, the method comprising:
activating a camera when an event occurs, and sensing whether or not the mobile terminal is mounted on a vehicle and whether or not the vehicle is driving using an image received through the camera; and
recognizing a gesture of a user to activate a gesture function for controlling the event when it is determined that the vehicle is driving in a state that the mobile terminal is mounted on the vehicle according to the sensed result,
wherein when a call is received, the method further comprising:
activating the gesture function,
recognizing a hand of the user from an image received through the camera, and
connecting the received call when the gesture of the hand corresponds to a preset gesture,
wherein when the received call is connected based on the gesture of the hand, the method further comprising:
controlling a volume of an audio output unit of the mobile terminal to be set differently based on a size of the recognized hand taking the preset gesture,
setting the volume of the audio output unit to a first level when the size of the recognized hand taking the preset gesture is a first size, and
setting the volume of the audio output unit to a second level greater than the first level when the size of the recognized hand taking the preset gesture is a second size smaller than the first size,
wherein the method further comprises:
controlling a voice reception sensitivity of a microphone of the mobile terminal to be different based on the size of the recognized hand taking the same preset gesture; and
increasing the voice reception sensitivity of the microphone as the size of the recognized hand taking the same preset gesture decreases.

18. The method of claim 17, wherein the camera comprises a front camera disposed on a front surface of a body of the mobile terminal and a rear camera disposed on a rear surface of the body,
   wherein said sensing step senses whether or not the mobile terminal is mounted on the vehicle and whether or not the vehicle is driving using an image received through the front camera and an image received through the rear camera when the event occurs.

19. The method of claim 17, further comprising:
   controlling the event based on the recognition of a preset gesture.

20. The method of claim 19, wherein said controlling step performs a first function associated with the event when a first gesture is recognized among preset gestures, and performs a second function different from the first function associated with the event when a second gesture different from the first gesture is recognized among the preset gestures.

* * * * *